(12) United States Patent
Morioka et al.

(10) Patent No.: US 12,068,878 B2
(45) Date of Patent: *Aug. 20, 2024

(54) COMMUNICATION DEVICE AND COMMUNICATION METHOD

(71) Applicant: Sony Group Corporation, Tokyo (JP)

(72) Inventors: Yuichi Morioka, Kanagawa (JP); Eisuke Sakai, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/198,847

(22) Filed: May 18, 2023

(65) Prior Publication Data

US 2023/0291596 A1  Sep. 14, 2023

Related U.S. Application Data

(63) Continuation of application No. 17/752,882, filed on May 25, 2022, now Pat. No. 11,799,681, which is a
(Continued)

(30) Foreign Application Priority Data

Jul. 7, 2015 (JP) ................................. 2015-135956

(51) Int. Cl.
*H04L 12/18* (2006.01)
*H04L 1/1607* (2023.01)
(Continued)

(52) U.S. Cl.
CPC ........ *H04L 12/1872* (2013.01); *H04L 1/1685* (2013.01); *H04L 1/1864* (2013.01);
(Continued)

(58) Field of Classification Search
CPC ............. H04L 12/1872; H04L 12/1886; H04L 12/189; H04L 1/1685; H04L 1/1864;
(Continued)

(56) References Cited

U.S. PATENT DOCUMENTS 6,128,305 A   10/2000  Hjalmtysson et al.
6,775,707 B1   8/2004  Bennett et al.
(Continued)

FOREIGN PATENT DOCUMENTS

CA    2746583 A1   6/2010
CN  101714893 A   5/2010
(Continued)

OTHER PUBLICATIONS

Extended European Search Report dated Jan. 30, 2019, issued in corresponding European Application No. 16821078.
(Continued)

*Primary Examiner* — Kevin D Mew
(74) *Attorney, Agent, or Firm* — XSENSUS LLP

(57) ABSTRACT

[Object] To provide a communication device and a communication method which are capable of achieving both an improvement in reliability of communication in which a frame is transmitted to a plurality of destinations and effective use of wireless communication resources.

[Solution] The communication device includes: a communication unit configured to perform communication of a frame. The communication unit transmits a transmission acknowledgment request frame for a transmission acknowledgment response frame including frequency allocation information specifying a transmission frequency of the transmission acknowledgment response frame, and receives the transmission acknowledgment response frame which has undergone frequency division multiplexing, on the basis of the frequency allocation information.

41 Claims, 14 Drawing Sheets

Related U.S. Application Data continuation of application No. 17/137,378, filed on Dec. 30, 2020, now Pat. No. 11,362,850, which is a continuation of application No. 16/429,164, filed on Jun. 3, 2019, now Pat. No. 10,887,121, which is a continuation of application No. 15/568,860, filed as application No. PCT/JP2016/062163 on Apr. 15, 2016, now Pat. No. 10,361,876.

(51) Int. Cl.
| | |
|---|---|
| *H04L 1/1829* | (2023.01) |
| *H04L 5/00* | (2006.01) |
| *H04W 28/04* | (2009.01) |
| *H04W 72/04* | (2023.01) |
| *H04L 12/70* | (2013.01) |

(52) U.S. Cl.
CPC .......... *H04L 5/0055* (2013.01); *H04L 5/0094* (2013.01); *H04L 12/1886* (2013.01); *H04L 12/189* (2013.01); *H04W 28/04* (2013.01); *H04W 72/04* (2013.01); *H04L 5/001* (2013.01); *H04L 5/0023* (2013.01); *H04L 2012/5642* (2013.01)

(58) Field of Classification Search
CPC ..... H04L 5/0055; H04L 5/0094; H04L 5/001; H04L 5/0023; H04W 28/04; H04W 72/04
See application file for complete search history.

(56) References Cited

U.S. PATENT DOCUMENTS

| | | | |
|---|---|---|---|
| 9,379,901 B2 | 6/2016 | Kim et al. | |
| 9,577,838 B2 | 2/2017 | Seok | |
| 10,236,950 B2* | 3/2019 | Wentink | H04L 1/1854 |
| 10,361,876 B2 | 7/2019 | Morioka et al. | |
| 2002/0099854 A1 | 7/2002 | Jorgensen | |
| 2005/0089005 A1 | 4/2005 | Sakoda et al. | |
| 2006/0234740 A1 | 10/2006 | Sakoda | |
| 2007/0153757 A1 | 7/2007 | Kim et al. | |
| 2007/0189207 A1 | 8/2007 | Sammour et al. | |
| 2009/0052363 A1 | 2/2009 | Matsue et al. | |
| 2009/0268697 A1 | 10/2009 | Jeon et al. | |
| 2009/0323608 A1 | 12/2009 | Adachi et al. | |
| 2010/0153807 A1 | 6/2010 | Kakani | |
| 2010/0260138 A1 | 10/2010 | Liu et al. | |
| 2011/0069684 A1 | 3/2011 | Jeon et al. | |
| 2011/0096710 A1 | 4/2011 | Liu et al. | |
| 2011/0243066 A1 | 10/2011 | Nayeb Nazar et al. | |
| 2012/0236779 A1 | 9/2012 | Lee et al. | |
| 2013/0077554 A1 | 3/2013 | Gauvreau et al. | |
| 2013/0188630 A1 | 7/2013 | Song | |
| 2013/0223301 A1 | 8/2013 | Lee et al. | |
| 2013/0286959 A1* | 10/2013 | Lou | H04L 5/003 370/329 |
| 2013/0301569 A1 | 11/2013 | Wang et al. | |
| 2013/0301605 A1 | 11/2013 | Kim et al. | |
| 2014/0086212 A1 | 3/2014 | Kafle et al. | |
| 2014/0280884 A1 | 9/2014 | Searle et al. | |
| 2014/0328195 A1 | 11/2014 | Sampath et al. | |
| 2014/0328235 A1 | 11/2014 | Merlin et al. | |
| 2014/0328313 A1 | 11/2014 | Merlin et al. | |
| 2014/0328325 A1 | 11/2014 | Bai et al. | |
| 2015/0036673 A1 | 2/2015 | Asterjadhi et al. | |
| 2015/0063320 A1 | 3/2015 | Merlin et al. | |
| 2015/0124689 A1* | 5/2015 | Merlin | H04W 4/06 370/312 |
| 2015/0245315 A1 | 8/2015 | Kawasaki | |
| 2015/0365940 A1 | 12/2015 | Chu et al. | |
| 2016/0088602 A1 | 3/2016 | Seok | |
| 2016/0128057 A1 | 5/2016 | Seok | |
| 2016/0226635 A1 | 8/2016 | Chu et al. | |
| 2016/0302229 A1* | 10/2016 | Hedayat | H04L 69/324 |
| 2016/0330714 A1* | 11/2016 | Hedayat | H04L 5/0023 |
| 2016/0337100 A1 | 11/2016 | Yang et al. | |
| 2016/0353357 A1 | 12/2016 | Asterjadhi et al. | |
| 2016/0381490 A1 | 12/2016 | Rico Alvarino et al. | |
| 2017/0012756 A1* | 1/2017 | Li | H04L 1/1614 |
| 2017/0134138 A1* | 5/2017 | Madhavan | H04L 1/1685 |
| 2017/0164245 A1 | 6/2017 | Chai et al. | |
| 2017/0272138 A1* | 9/2017 | Chun | H04L 1/1614 |
| 2017/0331587 A1 | 11/2017 | Kim et al. | |
| 2017/0338931 A1 | 11/2017 | Kim et al. | |
| 2017/0366362 A1 | 12/2017 | Sakai et al. | |
| 2018/0007561 A1 | 1/2018 | Adachi et al. | |
| 2018/0020460 A1 | 1/2018 | Hedayat | |
| 2018/0115403 A1 | 4/2018 | Sakai et al. | |
| 2018/0184401 A1 | 6/2018 | Ghosh et al. | |
| 2018/0213433 A1 | 7/2018 | Sugaya et al. | |

FOREIGN PATENT DOCUMENTS

| | | | |
|---|---|---|---|
| CN | 102792757 A | 11/2012 | |
| CN | 103178943 A | 6/2013 | |
| CN | 103312469 A | 9/2013 | |
| CN | 103686665 A | 3/2014 | |
| CN | 107710814 A | 2/2018 | |
| EP | 2294741 A1 | 3/2011 | |
| EP | 3133762 A1 | 2/2017 | |
| EP | 3244651 A1 * | 11/2017 | .......... H04L 12/189 |
| EP | 3322216 B1 * | 12/2020 | .......... H04L 1/1685 |
| JP | 2009-49704 A | 3/2009 | |
| KR | 20060067493 A | 6/2006 | |
| KR | 20150051911 A | 5/2015 | |
| WO | WO-2006041891 A1 | 4/2006 | |
| WO | WO-2008110894 A2 | 9/2008 | |
| WO | WO-2009136724 A2 | 11/2009 | |
| WO | WO-2009157902 A1 | 12/2009 | |
| WO | 2014/080698 A1 | 5/2014 | |
| WO | WO-2015068968 A1 | 5/2015 | |
| WO | 2015/095161 A1 | 6/2015 | |
| WO | 2016/174904 A1 | 11/2016 | |

OTHER PUBLICATIONS

International Search Report issued Jul. 5, 2016, in PCT/JP2016/062163 filed Apr. 15, 2016.
Communication pursuant to Article 94(3) EPC issued in European Application 16 821 078.9-1219 dated Oct. 17, 2019.
(3GPP TSG RAN2#61 20080215 R2-081052) Nokia Corporation Draft CR to TS 25.331—Introduction of UTRAN to E-UTRAN interworking 1-18.

* cited by examiner

COMMUNICATION DEVICE AND COMMUNICATION METHOD

CROSS-REFERENCE TO RELATED APPLICATIONS

This application is a continuation of U.S. application Ser. No. 17/752,882, filed May 25, 2022, which is a continuation of U.S. application Ser. No. 17/137,378, filed Dec. 30, 2020 (now U.S. Pat. No. 11,362,850), which is a continuation of U.S. application Ser. No. 16/429,164, filed Jun. 3, 2019 (now U.S. Pat. No. 10,887,121), which is a continuation of Ser. No. 15/568,860, filed Oct. 24, 2017 (now U.S. Pat. No. 10,361,876), which is based on PCT filing PCT/JP2016/062163, filed Apr. 15, 2016, and claims priority to JP 2015-135956, filed Jul. 7, 2015, the entire contents of each are incorporated herein by reference.

TECHNICAL FIELD

The present disclosure relates to communication devices and communication methods.

BACKGROUND ART

In recent years, wireless local area networks (LANs) as typified by IEEE (Institute of Electrical and Electronics Engineers) 802.11 have been widespread. In addition, along with the widespread use of wireless LANs, products supporting the wireless LANs have been increasing.

On the other hand, techniques for efficiently communicating with a plurality of communication devices have been developed. As such a technique, for example, a multicast scheme of transmitting frames to one or more communication devices at a time is known.

Here, there are cases in which, in order to improve reliability of communication, it is desirable to perform a transmission acknowledgment for frames (hereinafter also referred to as "acknowledgment (ACK)") for multicast frames, similarly to unicast frames. As such transmission acknowledgment, a Block ACK (BA) for transmission acknowledgment for a plurality of frames is known.

For example, the invention related to a wireless communication device that performs transmission of a Block Ack Request (BAR) frame indicating a transmission request for a BA frame and reception of a BA frame serving as a response to the BAR frame for each terminal in order of time after a multicast frame is transmitted to each terminal is disclosed in Patent Literature 1.

CITATION LIST

Patent Literature

Patent Literature 1: JP 2009-049704A

DISCLOSURE OF INVENTION

Technical Problem

However, in the invention disclosed in Patent Literature 1, it is difficult to efficiently use wireless communication resources. For example, wireless communication resources for transmission acknowledgment for multicast frames are chronologically allocated to each terminal serving as a transmission acknowledgment target. For this reason, there are cases in which it is difficult to allocate wireless communication resources to other communication until the transmission acknowledgment for all terminals is completed.

Further, the above-mentioned problem is not limited to the multicast communication but may occur similarly even in other communication such as frame multiplex communication in which a frame is transmitted to a plurality of destinations.

In this regard, the present disclosure proposes a communication device and a communication method which are novel and improved and capable of achieving both an improvement in reliability of communication in which a frame is transmitted to a plurality of destinations and effective use of wireless communication resources.

Solution to Problem

According to the present disclosure, there is provided a communication device including: a communication unit configured to perform communication of a frame. The communication unit transmits a transmission acknowledgment request frame for a transmission acknowledgment response frame including frequency allocation information specifying a transmission frequency of the transmission acknowledgment response frame, and receives the transmission acknowledgment response frame which has undergone frequency division multiplexing, on the basis of the frequency allocation information.

In addition, according to the present disclosure, there is provided a communication device including: a communication unit configured to perform communication of a frame. The communication unit receives a transmission acknowledgment request frame for a transmission acknowledgment response frame including frequency allocation information specifying a transmission frequency of the transmission acknowledgment response frame, and transmits the transmission acknowledgment response frame on the basis of the frequency allocation information. The transmission acknowledgment response frame undergoes frequency division multiplexing.

In addition, according to the present disclosure, there is provided a communication method including: transmitting, by a communication unit configured to perform communication of a frame, a transmission acknowledgment request frame for a transmission acknowledgment response frame including frequency allocation information specifying a transmission frequency of the transmission acknowledgment response frame; and receiving the transmission acknowledgment response frame which has undergone frequency division multiplexing, on the basis of the frequency allocation information.

In addition, according to the present disclosure, there is provided a communication method including: receiving, by a communication unit configured to perform communication of a frame, a transmission acknowledgment request frame for a transmission acknowledgment response frame including frequency allocation information specifying a transmission frequency of the transmission acknowledgment response frame; and transmitting the transmission acknowledgment response frame on the basis of the frequency allocation information. The transmission acknowledgment response frame undergoes frequency division multiplexing.

Advantageous Effects of Invention

As described above, according to the present disclosure, a communication device and a communication method which are capable of achieving both an improvement in reliability of communication in which a frame is transmitted to a plurality of destinations and effective use of wireless communication resources are provided. Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
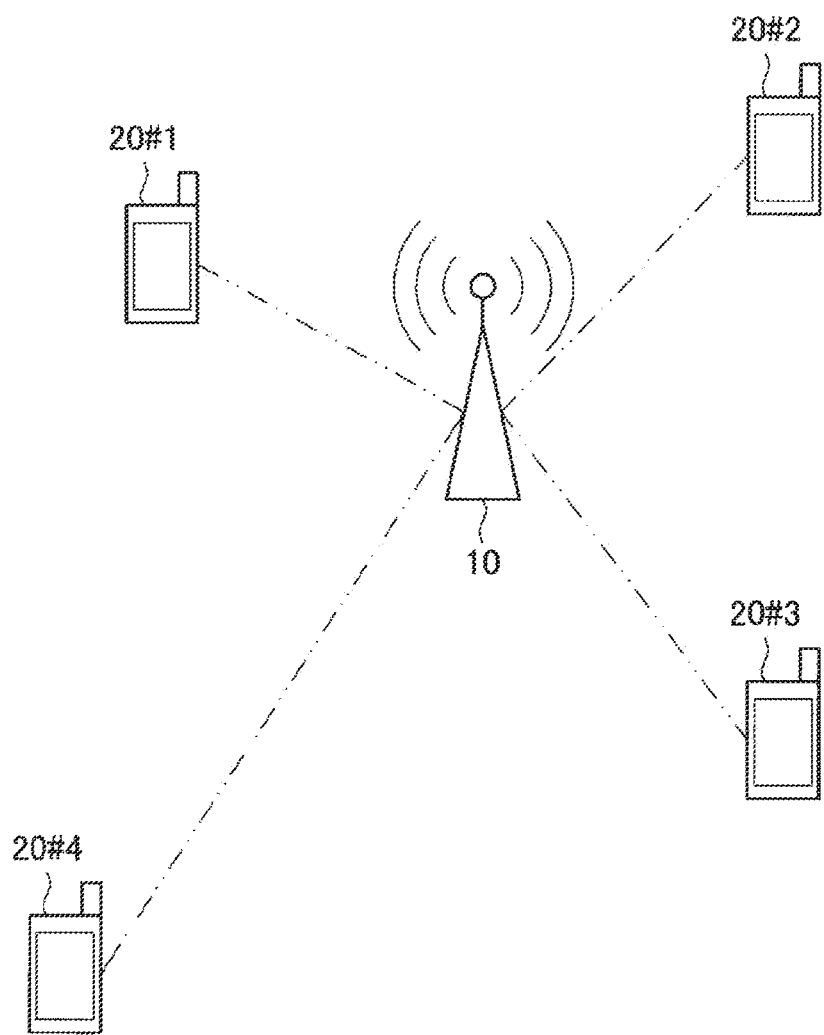
FIG. 1 is a diagram illustrating a configuration example of a communication system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Further, in this specification and the drawings, there are cases in which a plurality of structural elements having substantially the same function are distinguished by adding different numbers to the end of the same reference numeral. For example, a plurality of structural elements having substantially the same function are distinguished as necessary like an STA 20#1 and an STA 20#2. However, in a case where it is unnecessary to distinguish structural elements having substantially the same function, only the same reference numeral is added. For example, in a case where it is unnecessary to particularly distinguish the STA 20#1 and the STA 20#2, they are simply referred to as "STAs 20."

Note that, the description is given in the following order.
1. Overview of communication device according to embodiment of present disclosure
2. Communication device according to embodiment of present disclosure
2-1. Configuration of device
2-2. Technical feature
2-3. Process performed by device
2-4. Modification
3. Application example
4. Conclusion 1. Overview of Communication System According to Embodiment of Present Disclosure First, with reference to FIG. 1, an overview of a communication system according to an embodiment of the present disclosure will be described. FIG. 1 is a diagram illustrating a configuration example of a communication system according to the embodiment of the present disclosure.

The communication system is configured with a communication device 10 and a plurality of communication devices 20. Each of the communication device 10 and the communication device 20 has a wireless communication function. Particularly, the communication device 10 has a multicast communication function of transmitting frames to one or more communication devices. Further, the communication device 10 operates as an access point (hereinafter, also referred to as an "access point (AP)"), and the communication device 20 operates as a station (hereinafter also referred to as a "station (STA)"). Hereinafter, the communication device 10 is also referred to as an "AP 10," and the communication device 20 is also referred to as an "STA 20." For this reason, in the communication system, the multicast communication from the AP 10 to a plurality of STAs 20 can be performed. Further, communication from the AP 10 to the STA 20 is referred to as a "downlink (DL)," and communication from the STA 20 to the AP 10 is also referred to as an "uplink (UL)."

For example, as illustrated in FIG. 1, the communication system may be configured with the AP 10 and a plurality of STAs 20#1 to 20#4. The AP 10 and the STAs 20#1 to 20#4 are connected to each other via wireless communication and perform transmission and reception of frames directly with each other. For example, the AP 10 is a communication device conforming to IEEE 802.11 and transmits a multicast frame having each of the STAs 20#1 to 20#4 as a destination.

Figure 2:
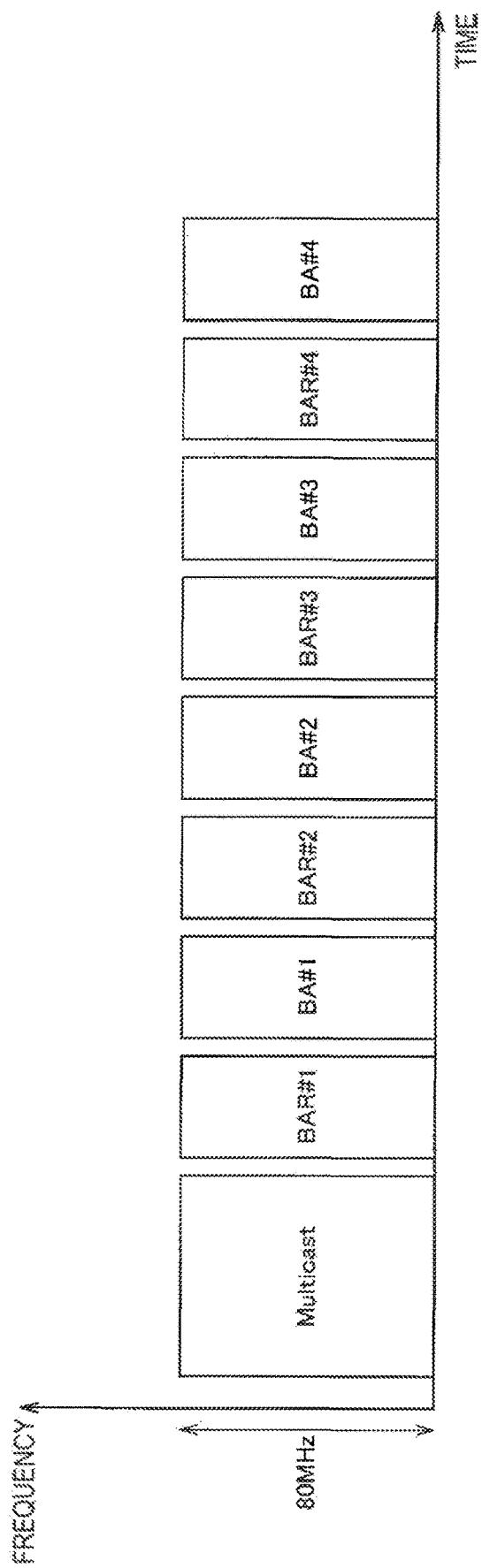
FIG. 2 is a diagram for describing a transmission acknowledgment in multicast communication of a related art.

Here, the transmission acknowledgment for the multicast frame is considered to be performed in order to improve the reliability of the multicast communication. Specifically, the BAR frame and the BA frame (hereinafter also referred to as a "transmission acknowledgment frame") are exchanged as the transmission acknowledgment for the multicast frame after the multicast frame is transmitted. A transmission acknowledgment in multicast communication of a related art will be described with reference to FIG. 2. FIG. 2 is a diagram for describing a transmission acknowledgment in a multicast communication of a related art.

The wireless communication resources for transmission of the transmission acknowledgment frame for the multicast frame are chronologically allocated to each STA of the transmission acknowledgment target. For example, wireless communication resources for transmission of BAR#1 to BAR#4 frames and BA#1 to BA#4 frames to STAs #1 to #4 are sequentially allocated along a time axis as illustrated in FIG. 2.

Next, multicast communication of the related art and a communication form for the transmission acknowledgment will be described.

First, after the multicast frame is transmitted to each of the STAs, the AP transmits the BAR frame to each of the STAs in order of time. For example, after the multicast frame is transmitted, the AP transmits the BAR#1 to BAR#4 frames illustrated in FIG. 2 to each of the STAs #1 to #4 in order of time.

Further, each STA transmits the BA frame to the AP when the BAR frame is received. For example, each of STAs #1 to #4 transmits the BA#1 to BA#4 frames illustrated in FIG. 2 to the AP when the BAR#1 to BAR#4 frames are received.

As described above, in the transmission acknowledgment in the multicast communication of the related art, the wireless communication resources for the transmission acknowledgment are chronologically allocated to each of the STAs. For this reason, there are cases in which it is difficult to allocate wireless communication resources to other communication until the transmission acknowledgment for all terminals is completed. Further, the above-mentioned problem is not limited to the multicast communication but may occur similarly even in other communication such as frame multiplex communication in which a frame is transmitted to a plurality of destinations.

Figure 3:
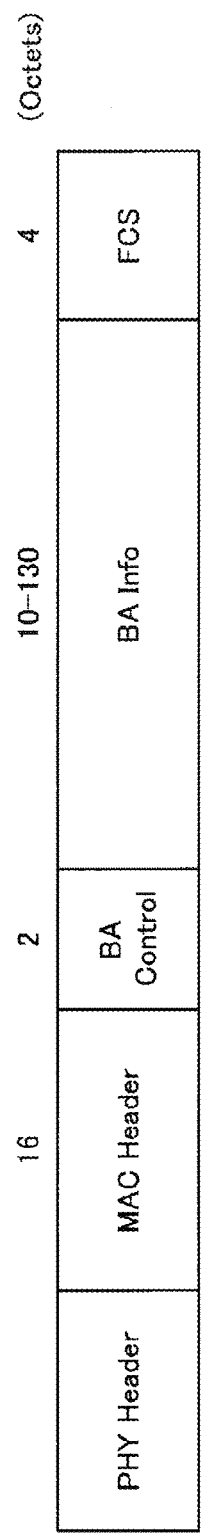
FIG. 3 is a diagram illustrating a configuration example of an existing BAR frame.

Further, in a case in which data for the transmission acknowledgment is smaller in an amount than data transmitted through a frame which is a transmission acknowledgment target, the wireless communication resources may be wasted. The waste of the wireless communication resources in the communication for the transmission acknowledgment will be described in detail with reference to FIG. 3. FIG. 3 is a diagram illustrating a configuration example of an existing BAR frame.

Here, the communication for the transmission acknowledgment is generally performed using substantially the same bandwidth as a bandwidth used for the transmission of the frame which is the transmission acknowledgment target. For example, the BAR frame and the BA frame are transmitted through the same bandwidth as the bandwidth used for transmission of the multicast frame.

On the other hand, the data size of the transmission acknowledgment is often smaller than the data size of the data frame. For example, as illustrated in FIG. 3, the BAR frame includes a physical layer header (PHY Header), a media access control header (MAC Header), BA Control, BA Info, and a frame check sequence (FCS). The data size of the BAR frame is at most 152 octets (bytes) as illustrated in FIG. 3, but the data size of the data frame is usually larger than 152 octets (bytes). For this reason, in this case, an excessive bandwidth is allocated to the communication for the transmission acknowledgment.

In this regard, the present disclosure proposes a communication device which is capable of achieving both an improvement in reliability of communication in which a frame is transmitted to a plurality of destinations and effective use of wireless communication resources. Next, details thereof will be described. Note that, FIG. 1 illustrates the communication system including the AP 10 and the STAs 20 as an example of the communication system. One of the STAs 20 may be a communication device that establishes a plurality of direct links with other STAs 20 instead of the AP 10. In that case, DL can be replaced with "simultaneous transmission from one STA to a plurality of STAs," and UL can be replaced with "simultaneous transmission from a plurality of STAs to one STA."

2. Communication Device According to Embodiment of Present Disclosure

As described above, the overview of the communication system according to the embodiment of the present disclosure has been described. Next, the AP 10 and the STAs 20 according to the embodiments of the present disclosure will be described. An example in which the BAR frame and the BA frame are exchanged as a transmission acknowledgment request frame and a transmission acknowledgment response frame will be described below.

2-1. Configuration of Device

Figure 4:
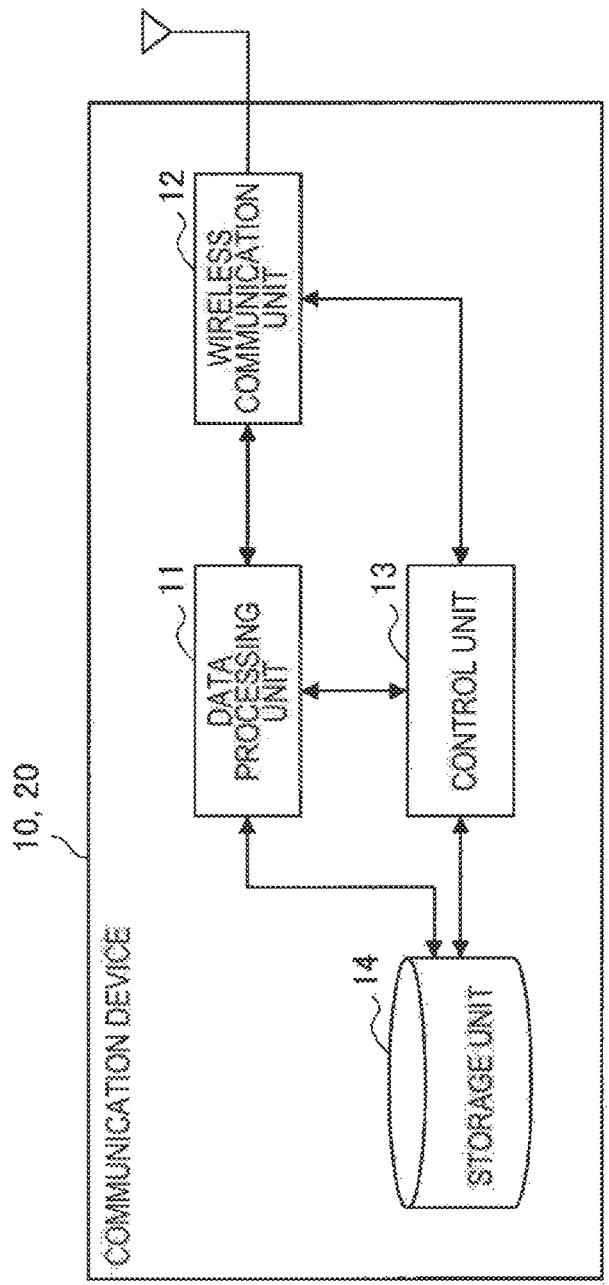
FIG. 4 is a block diagram illustrating an example of a schematic functional configuration of each of an AP and an STA according to an embodiment of the present disclosure.

First, with reference to FIG. 4, a basic functional configuration of each of the AP 10 and the STA 20 according to the embodiment of the present disclosure will be described. FIG. 4 is a block diagram illustrating an example of a schematic functional configuration of each of the AP and the STA 20 according to the embodiment of the present disclosure.

As illustrated in FIG. 4, each of the AP 10 and the STA 20 includes a data processing unit 11, a wireless communication unit 12, a control unit 13, and a storage unit 14.

As a part of a communication unit, the data processing unit 11 performs a process on data for transmission and reception. Specifically, the data processing unit 11 generates a frame on the basis of data from a higher layer of communication, and provides the generated frame to the wireless communication unit 12. For example, the data processing unit 11 generates a frame (or a packet) from the data, and performs a process on the generated frame such as addition of a MAC header for media access control (MAC), addition of an error detection code, or the like. In addition, the data processing unit 11 extracts data from the received frame, and provides the extracted data to the higher layer of communication. For example, the data processing unit 11 acquires data by analyzing a MAC header, detecting and correcting a code error, and performing a reorder process, or the like with regard to the received frame.

The wireless communication unit 12 has a signal processing function, a wireless interface function, and the like as part of a communication unit.

The signal processing function is a function of performing signal processing such as modulation on frames. Specifically, the wireless communication unit 12 performs encoding, interleaving, and modulation on the frame provided from the data processing unit 11 in accordance with a coding and modulation scheme set by the control unit 13, adds a preamble and a PHY header, and generates a symbol stream. Further, the wireless communication unit 12 acquires a frame by performing demodulation, decoding, and the like on the symbol stream obtained by a process of the wireless interface function, and provides the obtained frame to the data processing unit 11 or the control unit 13.

The wireless interface function is a function to transmit/receive a signal via an antenna. Specifically, the wireless communication unit 12 converts a signal related to the symbol stream obtained through the process performed by the signal processing function into an analog signal, amplifies the signal, filters the signal, and up-converts the frequency. Next, the wireless communication unit 12 transmits the processed signal via the antenna. In addition, on the signal obtained via the antenna, the wireless communication unit 12 performs a process that is opposite to the process at the time of signal transmission such as down-conversion in frequency or digital signal conversion.

As a part of the communication unit, the control unit 13 controls entire operation of the AP 10 or the STA 20. Specifically, the control unit 13 performs a process such as exchange of information between functions, setting of communication parameters, or scheduling of frames (or packets) in the data processing unit 11.

The storage unit 14 stores information to be used for process to be performed by the data processing unit 11 or the control unit 13. Specifically, the storage unit 14 stores information stored in a transmission frame, information acquired from a receiving frame, information on a communication parameter, or the like.

2-2. Technical Feature

Next, characteristic functions of the AP 10 and the STA 20 according to one embodiment of the present disclosure will be described.

Functions of AP

First, the characteristic functions of the AP 10 will be described.

Transmission of Multicast Frame

The AP 10 transmits the multicast frame to the STA 20. Specifically, the control unit 13 causes the data processing unit 11 to generate a multicast frame whose destination is one or a plurality of STAs 20, and the wireless communication unit 12 transmits the generated multicast frame. For example, the multicast frame may be a data frame. The multicast frame may be a control frame or a management frame.

Decision of Transmission Acknowledgment Target

The AP 10 decides the STA 20 which is the transmission acknowledgment target for the multicast frame. Specifically, the control unit 13 decides the number of STAs 20 serving as the transmission acknowledgment target, and selects the decided number or less f STAs 20 as the transmission acknowledgment target from the STAs 20 which are the destination of the multicast frame.

More specifically, the control unit 13 decides the number of STAs 20 serving as the transmission acknowledgment target on the basis of a congestion degree of the communication. For example, the control unit 13 decides the number of STAs 20 serving as the transmission acknowledgment target in accordance with an amount of available wireless communication resources. The control unit 13 may decide the number of the STAs 20 serving as the transmission acknowledgment target on the basis of a predetermined value. For example, the predetermined value is stored in the storage unit 14.

Further, the control unit 13 selects the STA 20 serving as the transmission acknowledgment target from the STAs 20 which are the destination of the multicast frame on the basis of a reception characteristic of the STA 20. For example, the reception characteristic of the STA 20 includes at least one of a symbol error rate, a signal to noise ratio (SN ratio), a communication throughput, and the number of multicast frames successfully received by the STA 20. Then, the control unit 13 preferentially selects the STA 20 having a lower reception characteristic, for example, a lower SN ratio as the transmission acknowledgment target. In this case, since the STA 20 having the communication reliability lower than other STAs 20 is selected as the transmission acknowledgment target, it is possible to effectively improve the reliability of the entire multicast communication.

As described above, the AP 10 decides the number of STAs 20 serving as the transmission acknowledgment target, and selects the decided number or less of STAs 20 as the transmission acknowledgment target from the STAs 20 which are the destination of the multicast frame. Therefore, the radio transmission resources for the transmission acknowledgment are suppressed from being tightened since the number of STAs 20 serving as the destination of the multicast frame is increased. As a result, it is possible to perform the transmission acknowledgment for the multicast frame having the good efficiency.

Allocation of Wireless Communication Resources for Transmission Acknowledgment

Figure 5:
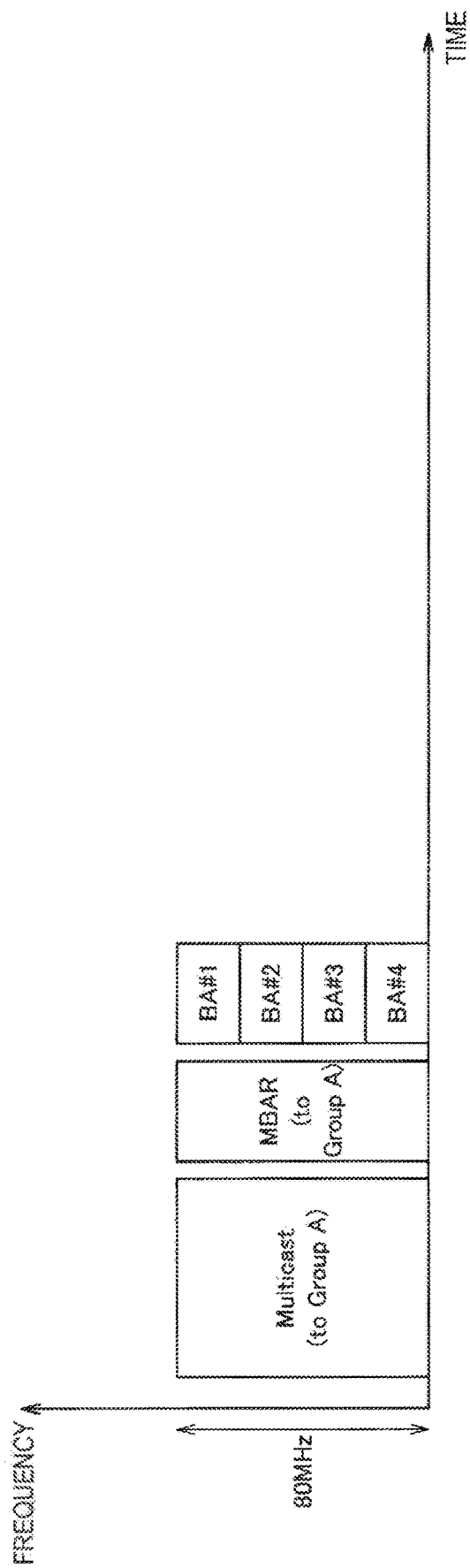
FIG. 5 is a diagram for describing an example of allocation of wireless communication resources of an AP according to the present embodiment.
Figure 6:
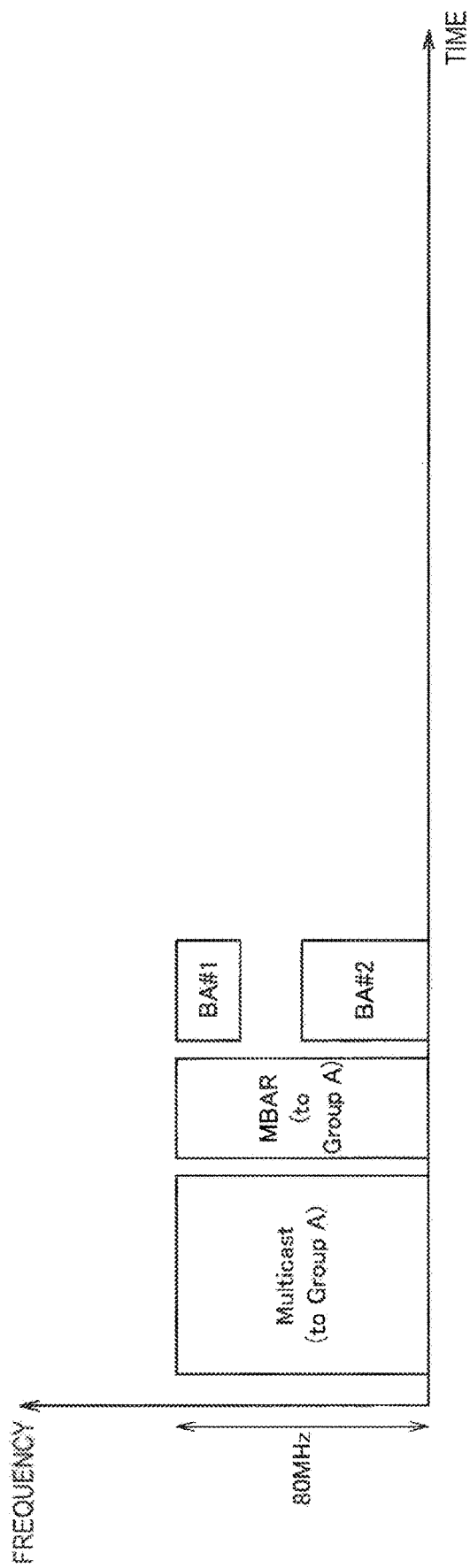
FIG. 6 is a diagram for describing another example of allocation of wireless communication resources of an AP according to the present embodiment.

The AP 10 allocates the wireless communication resources for the transmission acknowledgment to each of the STAs 20 decided as the transmission acknowledgment target. Specifically, the control unit 13 decides a center frequency and a bandwidth used in the transmission acknowledgment response as a transmission frequency for each of the STAs 20 of the transmission acknowledgment target. The allocation of the wireless communication resources will be described in detail with reference to FIGS. 5 and 6. FIG. 5 is a diagram for describing an example of the allocation of the wireless communication resources of the AP 10 according to the present embodiment and FIG. 6 is a diagram for describing another example of the allocation of the wireless communication resources of the AP 10 according to the present embodiment.

The control unit 13 decides the center frequency to be allocated to each of the STAs 20 selected as the destination of the BAR frame transmitted in the same period, that is, the transmission acknowledgment target as the center frequency differing for each STA 20. For example, as illustrated in FIG. 5, the wireless communication resources are allocated to BA#1 to BA#4 frames in the same period, but the center frequencies of the allocated wireless communication resources are different from each other. The center frequencies of the wireless communication resources allocated in different periods may be the same.

Here, the wireless communication resources may be allocated biased to a specific band, depending on a center frequency decision method. Further, there are also cases where the band to which the wireless communication resources are unevenly allocated is crowded. In this case, the communication efficiency in the transmission acknowledgment response may decrease.

In this regard, the AP 10 distributes the band used for the transmission of the transmission acknowledgment response frame to the STAs 20 selected as the transmission acknowledgment target. Specifically, the control unit 13 decides the center frequency on the basis of at least one of identification information of the selected STA 20 and time information of the AP 10.

For example, the identification information is a connection identifier such as an association identifier (AID), and the time information is a time stamp obtained using a time synchronization function (TSF) or the like (hereinafter also referred to as "TSFv"). Then, the control unit 13 decides the center frequency using the following Formula.

[Math. 1]

$$Ch=\mod[(TSFv+AID),CH\_NUM] \quad (1)$$

In Formula (1), Ch indicates an index indicating a channel number, that is, the center frequency, and CH_NUM indicates the number of channels available for the transmission acknowledgment. The center frequency is uniquely specified from Ch. Further, since TSFv has a fine grain size, it is desirable that TSFv rounded to the extent that there is no error between AP 10 and STA 20 is used.

The control unit 13 may decide the center frequency to be allocated as a center frequency that is different from the center frequency of the multicast frame. For example, as illustrated in FIG. 5, the center frequency to be allocated to the BA#1 to BA#4 frames is different from the center frequency to be allocated to the multicast frame. Of course, the center frequency of the wireless communication resources for the transmission acknowledgment may be the same as the center frequency allocated to the multicast frame.

Further, the control unit 13 decides a bandwidth allocated to each of the STAs 20 selected as the destination of the BAR frame, that is, the transmission acknowledgment target as a different bandwidth among at least some of the STAs 20. Specifically, the control unit 13 decides a bandwidth of a certain STA 20 on the basis of whether or not a center frequency adjacent to the center frequency allocated to the certain STA 20 is allocated to other STAs 20.

Here, in IEEE 802.11, the BAR frame is supposed to be transmitted through a bandwidth of 20 MHz, that is, one channel. Therefore, when available bandwidths are two or more channels, it is possible to transmit the same BAR frame using the bandwidth of the two or more channels. As a result, in a communication device serving as a reception side, that is, the STA 20, it is desirable to successfully receive at least one of a plurality of BAR frames, and thus a frequency diversity effect is obtained, and it is possible to improve the reliability of the communication for the transmission acknowledgment response.

For example, as illustrated in FIG. 6, since the center frequency adjacent to the center frequency of the BA#2 frame is not allocated to another STA 20, that is, since the transmission acknowledgment for other STAs 20 is not performed using the adjacent center frequency, a wider bandwidth than the bandwidth of the BA#1 frame is allocated to the BA#2 frame. Of course, the same bandwidth may be allocated to each of the STAs 20. For example, as illustrated in FIG. 5, the same bandwidth is allocated to the BA#1 to BA#4 frames.

Further, the bandwidth need not be necessarily expanded even when the adjacent center frequency is not allocated to other STAs 20. For example, as illustrated in FIG. 6, although the center frequency adjacent to the center frequency of the BA#1 frame is empty, the bandwidth of the BA#1 is not expanded.

Further, in addition to the presence or absence of the allocation of the adjacent center frequency to other STAs 20, other conditions may be used for the decision of the bandwidth. For example, the control unit 13 decides the bandwidth on the basis of the presence or absence of allocation of the adjacent center frequency to the other STAs 20 and the reception characteristic of the STA 20.

Further, the control unit 13 may decide a bandwidth used for the transmission of the transmission acknowledgment response frame in the same period as the bandwidth different from the bandwidth of the multicast frame. For example, as illustrated in FIG. 6, a sum of bandwidths allocated to the BA#1 to BA#2 frames transmitted in the same period is narrower than the bandwidth allocated to the multicast frame. Further, a sum of the bandwidths allocated to the BA frames may be the same as the bandwidth allocated to the multicast frame or may be wider than the bandwidth allocated to the multicast frame.

Further, the control unit 13 may decide the bandwidth allocated to each of the STAs 20 as the bandwidth different from the bandwidth of the multicast frame. For example, as illustrated in FIG. 5, the bandwidths allocated to the BA#1 to BA#4 frames are narrower than the bandwidth allocated to the multicast frame. Of course, the bandwidth of the wireless communication resources for the transmission acknowledgment may be the same as the bandwidth allocated to the multicast frame or may be wider than the bandwidth allocated to the multicast frame.

Transmission of Transmission Acknowledgment Request Frame

Figure 7:
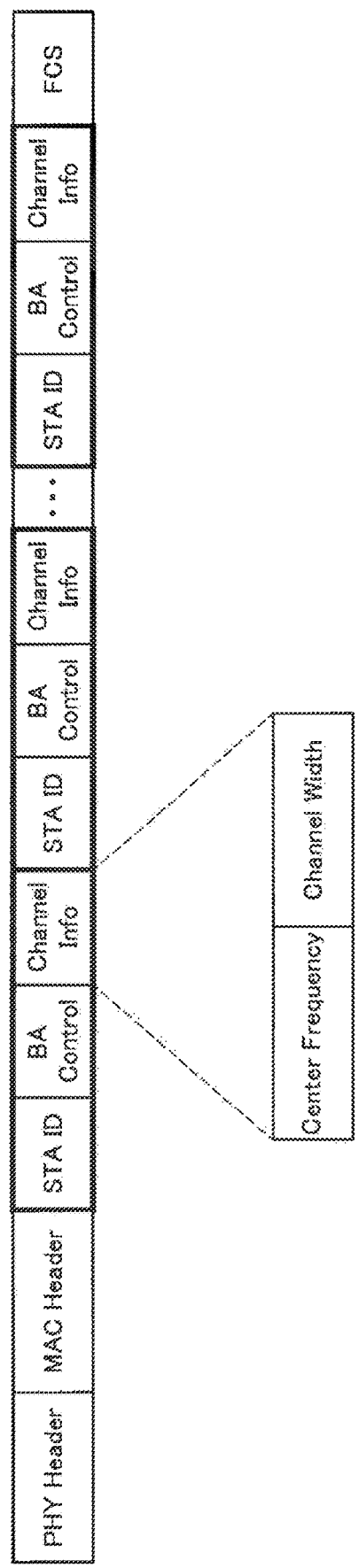
FIG. 7 is a diagram illustrating a configuration example of a transmission acknowledgment request frame transmitted by an AP according to the present embodiment.

The AP 10 transmits the transmission acknowledgment request frame for the transmission acknowledgment response frame including information specifying the transmission frequency of the transmission acknowledgment response frame (hereinafter also referred to as "frequency allocation information"). Specifically, the control unit 13 causes the data processing unit 11 to generate a BAR frame including the frequency allocation information specifying the transmission frequency of the BA frame for the multicast frame. Then, the wireless communication unit 12 transmits the generated BAR frame. For example, a BAR frame (a Multi-Channel BAR (MBAR)) for the multicast frame illustrated in FIG. 5 is transmitted to each of STAs 20 belonging to a multicast group (for example, a group A) that is the destination of the multicast frame. The MBAR frame according to the present embodiment will be described in detail with reference to FIG. 7. FIG. 7 is a diagram illustrating a configuration example of the MBAR frame transmitted by the AP 10 according to the present embodiment.

First, an overall configuration of the MBAR frame will be described. For example, as illustrated in an upper part of FIG. 7, the MBAR frame includes a PHY Header, a MAC Header, and BAR information of each STA 20 of the transmission acknowledgment target (hereinafter also referred to as simply "BAR information") and an FCS. A multicast group ID of a transmitted multicast frame is stored in a receiver address (RA) field of the MAC Header serving as the destination information of the MBAR frame. Further, only the STA 20 of the transmission acknowledgment target may be stored as the destination information of the MBAR frame.

Next, the BAR information field for each STA 20 of the transmission acknowledgment target will be described. For example, as illustrated in the upper part of FIG. 7, the BAR information field of each STA 20 of the transmission acknowledgment target includes fields such as STA ID and BA Control each serving as a field in which response device information is stored and Channel Info serving as a filed in which the frequency allocation information is stored.

Further, the Channel Info field will be described. For example, as illustrated in a lower part of FIG. 7, the Channel Info field includes fields such as Center Frequency and Channel Width.

Information specifying the center frequency of the transmission frequency for the transmission acknowledgment response frame serving as the frequency allocation information (hereinafter also referred to as "primary channel information") is stored in the Center Frequency field. For example, the primary channel information is information indicating the center frequency decided for each of the STAs 20 individually.

Information specifying the bandwidth of the transmission frequency for the transmission acknowledgment response frame serving as the frequency allocation information (hereinafter also referred to as "bandwidth information") is stored in the Channel Width field. For example, the bandwidth information is information indicating the bandwidth decided for each of the STAs 20 individually.

The example in which Channel Info is set for each STA 20 of the transmission acknowledgment target has been described, but single Channel Info common to the STAs 20 may be set. Specifically, information related to a calculation formula for calculating the center frequency is stored in the Center Frequency field. For example, the primary channel information includes information indicating Formula (1), information indicating TSFv in Formula (1), and information indicating CH_NUM. Furthermore, the primary channel information may include only the information indicating TSFv in a case in which Formula (1) and CH_NUM are known to the STA 20. In this case, the STA 20 calculates the bandwidth of the STA 20 by applying the AID of the STA 20 and TSFv included in the primary channel information to Formula (1). Accordingly, the data amount of the MBAR frame is reduced as compared with the case where the primary channel information of each STA 20 is stored, and it is possible to effectively use the wireless communication resources.

Further, information indicating the maximum bandwidth and the minimum bandwidth among the bandwidths allocated to the selected STAs 20 is stored in the Channel Width field. For example, the STA 20 transmits the BA frame using any one of the minimum bandwidth and the maximum bandwidth stored in the bandwidth information. In this case, the data amount of the MBAR frame is reduced as compared with the case in which the bandwidth information of each STA 20 is stored, and it is possible to effectively use the wireless communication resources.

Further, only one of the Center Frequency field and the Channel Width field may be a field for storing one piece of information common to the STAs 20 of the transmission acknowledgment target described above.

Reception of Transmission Acknowledgment Response Frame

The AP 10 receives the transmission acknowledgment response frame which has undergone the frequency division multiplexing on the basis of the frequency allocation information. Specifically, the wireless communication unit 12 receives the BA frame which has undergone the frequency division multiplexing and been transmitted through the transmission frequency specified by the frequency allocation information notified to the STA 20 through the MBAR frame. For example, after the BAR frame is transmitted, the wireless communication unit 12 receives a BA frame group which has undergone the frequency division multiplexing as a response to the BAR frame, and acquires the BA frame of each of the STAs 20 from the BA frame group on the basis of the center frequency and the bandwidth notified to each of the STAs 20 of the transmission acknowledgment target through the BAR frame. The transmission acknowledgment response frame is received only from the STA 20 specified from the response device information included in the transmission acknowledgment request frame.

Functions of STA

Next, the characteristic functions of the STA 20 will be described.

Reception of Multicast Frame

The STA 20 receives the multicast frame from the AP 10. The control unit 13 sets a communication frequency of the STA 20 to the center frequency and the bandwidth at which the multicast frame is received successfully in advance.

Reception of Transmission Acknowledgment Request Frame

The STA 20 receives the transmission acknowledgment request frame including the frequency allocation information from the AP 10. Specifically, the wireless communication unit 12 receives the MBAR frame from the AP 10 after receiving the multicast frame. If the MBAR frame is received by the wireless communication unit 12, in a case in which the STA 20 belongs to the multicast group which is the destination of the MBAR frame, the data processing unit 11 acquires the BAR information matching the STA ID of the STA 20 from the MBAR frame.

Setting of Transmission Frequency

If the transmission acknowledgment request frame including the frequency allocation information is received, the STA 20 sets the transmission frequency of the STA 20 as the transmission frequency for transmitting the transmission acknowledgment response frame. Specifically, the control unit 13 sets the transmission frequency specified from the frequency allocation information included in the BAR information acquired by the data processing unit 11. For example, the control unit 13 sets the transmission frequency of the STA 20 to the center frequency and the bandwidth respectively specified from the primary channel information and the bandwidth information included in the MBAR frame.

In a case in which only information for calculating the center frequency and the bandwidth is included in the MBAR frame as described above, the control unit 13 calculates the center frequency and the bandwidth on the basis of the primary channel information and the bandwidth information.

Transmission of Transmission Acknowledgment Response Frame

The STA 20 transmits the transmission acknowledgment response frame for the received transmission acknowledgment request frame on the basis of the frequency allocation information included in the transmission acknowledgment request frame. Specifically, after the MBAR frame is received, the wireless communication unit 12 transmits the BA frame using the transmission frequency specified from the frequency allocation information included in the MBAR frame. For example, in a case in which the BAR information matching the STA ID of the STA 20 is included in the received MBAR frame, the control unit 13 causes the data processing unit 11 to generate the BA frame as the response to the MBAR frame. Then, the wireless communication unit 12 transmits the generated BA frame to the AP 10 through the center frequency and the bandwidth set on the basis of the frequency allocation information included in the acquired BAR information. As a result, the BA frame transmitted from the STA 20 undergoes the frequency division multiplexing, and the BA frame group which has undergone the frequency division multiplexing is received by the AP 10.

2-3. Process of Device

Next, a process of the AP 10 and the STA 20 according to the present embodiment will be described.

Process of AP

Figure 8:
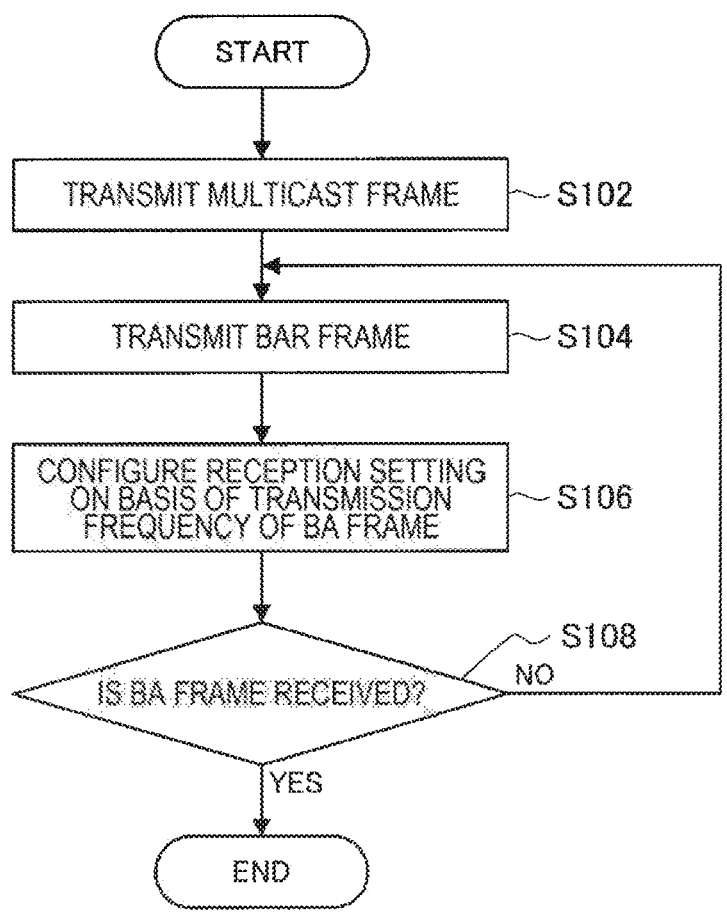
FIG. 8 is a flowchart conceptually illustrating a process of an AP according to the present embodiment.

First, the process of the AP 10 according to the present embodiment will be described with reference to FIG. 8. FIG. 8 is a flowchart conceptually illustrating the process of the AP 10 according to the present embodiment.

The AP 10 transmits the multicast frame to each of the STAs 20 (step S102). Specifically, the control unit 13 causes the data processing unit 11 to generate the multicast frame whose destination is each of the STAs 20. Then, the wireless communication unit 12 transmits the generated multicast frame.

Next, the AP 10 transmits the BAR frame to each of the STAs 20 (step S104). Specifically, the control unit 13 generates the MBAR frame including the frequency allocation information for the STA 20 of the transmission acknowledgment target in which the multicast group of the multicast frame transmitted to the data processing unit 11 is the destination. Then, the wireless communication unit 12 transmits the generated MBAR frame. Further, the MBAR frame may be aggregated with the multicast frame.

Then, the AP 10 configures a reception setting on the basis of the transmission frequency of the BA frame (step S106). Specifically, the control unit 13 causes the wireless communication unit 12 to set a reception frequency so that the BA frame transmitted through the center frequency and the bandwidth specified on the basis of the frequency allocation information included in the MBAR frame is received.

Then, the AP 10 determines whether or not the BA frame is received (step S108). Specifically, after the MBAR frame is transmitted, the control unit 13 determines whether or not the BA frame serving as the response to the MBAR frame is received from each of the STAs 20 of the transmission acknowledgment target. In a case in which the BA frame is determined not to be received from the STA 20 of the transmission acknowledgment target, the control unit 13 causes the wireless communication unit 12 to retransmit the BAR frame or the MBAR frame for the BA frame which is not yet received. In a case in which the BA frame is not received within a predetermined period of time, the process may return to step S102, and the multicast frame or the data frame may be retransmitted to the STA 20 that has not received the BA frame.

Process of STA

Figure 9:
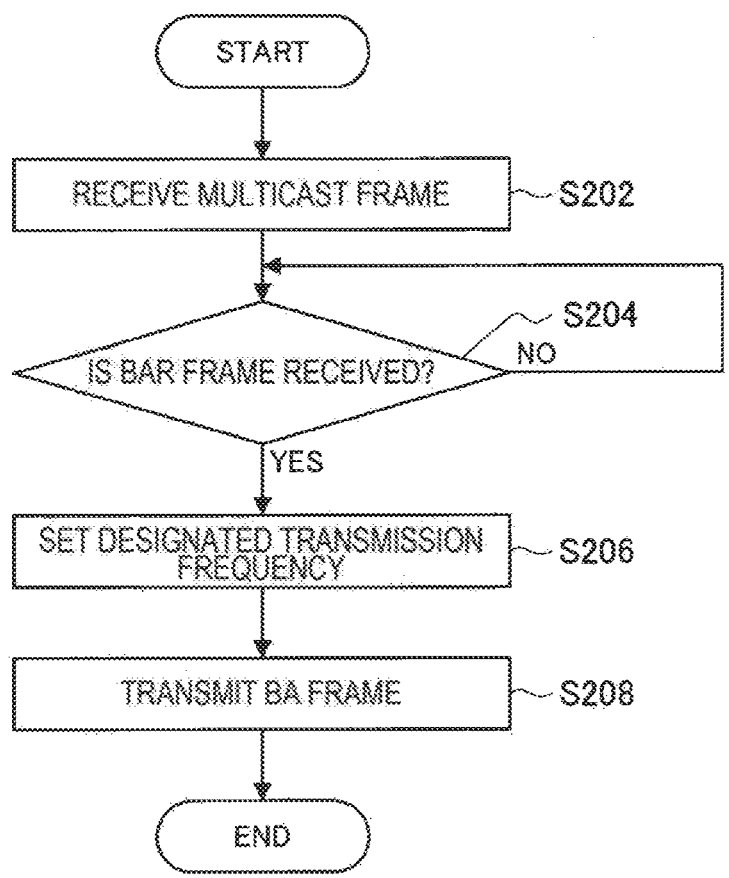
FIG. 9 is a flowchart conceptually illustrating a process of an STA according to the present embodiment.

Next, a process of the STA 20 according to the present embodiment will be described with reference to FIG. 9. FIG. 8 is a flowchart conceptually illustrating the process of the STA 20 according to the present embodiment.

The STA 20 receives the multicast frame from the AP 10 (step S202). Specifically, the wireless communication unit 12 receives the multicast frame from the AP 10.

Then, the STA 20 receives the BAR frame from the AP 10 (step S204). Specifically, the wireless communication unit 12 receives the MBAR frame after receiving the multicast frame. If the MBAR frame is received, the control unit 13 acquires the BAR information matching the STA ID of the STA 20 in a case in which the STA 20 belongs to the multicast group which is the destination of the MBAR frame. In a case in which the STA 20 does not belong to the multicast group or in a case in which there is no BAR information matching the STA ID of the STA 20, the process ends.

If the BAR frame is received, the STA 20 sets a designated transmission frequency as the transmission frequency of the STA 20 (step S206). Specifically, the control unit 13 sets the transmission frequency of the STA 20 on the basis of the primary channel information and the bandwidth information included in the BAR information acquired from the received MBAR frame.

Then, the STA 20 transmits the BA frame to the AP 10 (step S208). Specifically, the control unit 13 causes the data processing unit 11 to generate the BA frame serving as the response to the MBAR frame. Then, the wireless communication unit 12 transmits the generated BA frame to the AP 10 through the set transmission frequency.

2-4. Conclusion of Embodiment of Present Disclosure

As described above, according to one embodiment of the present disclosure, the AP 10 transmits the transmission acknowledgment request frame for the transmission acknowledgment response frame including the frequency allocation information specifying the transmission frequency of the transmission acknowledgment response frame, and receives the transmission acknowledgment response frame which has undergone the frequency division multiplexing on the basis of the frequency allocation information. Further, the STA 20 receives the transmission acknowledgment request frame and transmits the transmission acknowledgment response frame on the basis of the frequency allocation information. As a result, the transmission acknowledgment response frame undergoes the frequency division multiplexing. Thus, the transmission acknowledgment response related to the communication in which a frame is transmitted to a plurality of destinations is performed using the frequency division multiplex communication, and thus it is possible to effectively use the wireless communication resources while improving the reliability of the communication as compared with the case in which the communication for the transmission acknowledgment response is chronologically performed.

Further, the transmission acknowledgment response frame is transmitted by the STA 20 through the transmission frequency specified from the frequency allocation information. Therefore, the reliability of the transmission acknowledgment response frame being received by the AP 10 can be improved, and the communication efficacy can be improved.

Further, the transmission acknowledgment response frame includes the transmission acknowledgment response frame for the multicast frame. Therefore, it is possible to effectively use the wireless communication resources while improving the reliability of the multicast communication.

Further, the transmission acknowledgment request frame may be concatenated to the frame which is the transmission acknowledgment target. Therefore, since the standby time from the transmission of the multicast frame to the transmission of the transmission acknowledgment request frame is saved, it is possible to reduce the time taken for the transmission acknowledgment, that is, to reduce the wireless communication resources used for the transmission acknowledgment.

The transmission acknowledgment request frame includes the response device information specifying the communication device which is requested to transmit the transmission acknowledgment response frame, and the AP 10 receives the transmission acknowledgment response frame from the communication device specified on the basis of the response device information. Further, in a case in which the STA 20 is the communication device specified from the response device information, the STA 20 transmits the transmission acknowledgment response frame. Therefore, since the transmission acknowledgment response frame is transmitted to only a desired communication device, it is possible to further effectively use the wireless communication resources.

Further, the frequency allocation information includes the information specifying the center frequency of the transmission frequency. Therefore, since the notification of the center frequency is given to the STA 20 through the frame, the AP 10 is able to dynamically allocate the center frequency and perform the transmission acknowledgment response suitable for a communication environment, the state of the STA 20 or the like.

Further, the center frequency differs for each destination of the transmission acknowledgment request frame transmitted during the same period. Thus, since a collision of frames or interference of signals is prevented in the transmission acknowledgment response performed using the center frequency, it is possible to perform the efficient communication in the transmission acknowledgment response.

Further, the center frequency is specified on the basis of at least one of the identification information for the destination of the transmission acknowledgment request frame and the time information on its own device. Therefore, it is possible to suppress the center frequency from being allocated biased to the congested band.

Further, the frequency allocation information includes the information specifying the bandwidth of the transmission frequency. Therefore, since the notification of the bandwidth is given to the STA 20 through the frame, the AP 10 is able to dynamically allocate the bandwidth and perform the transmission acknowledgment response suitable for the communication environment or the state of the STA 20.

Further, the bandwidth is different between at least some of the destinations of the transmission acknowledgment request frame. Therefore, since the bandwidth suitable for each of the STAs 20 is allocated, it is possible to efficiently use the bandwidth in the transmission acknowledgment response of the STA 20 and improve the communication efficiency.

Further, the center frequency is different from the center frequency of the frame which is the transmission acknowledgment target. Further, the bandwidth used for the transmission of the transmission acknowledgment response frame in the same period is different from the bandwidth of the frame which is the transmission acknowledgment target. Therefore, the degree of freedom for the allocation of the wireless communication resources for the transmission acknowledgment response is increased, and it is possible to improve the efficiency of transmission acknowledgment response.

2-5. Modified Examples

One embodiment of the present disclosure has been described above. The present embodiment is not limited to the above example. First and second modified examples of the present embodiment will be described below.

First Modified Example

Figure 10:
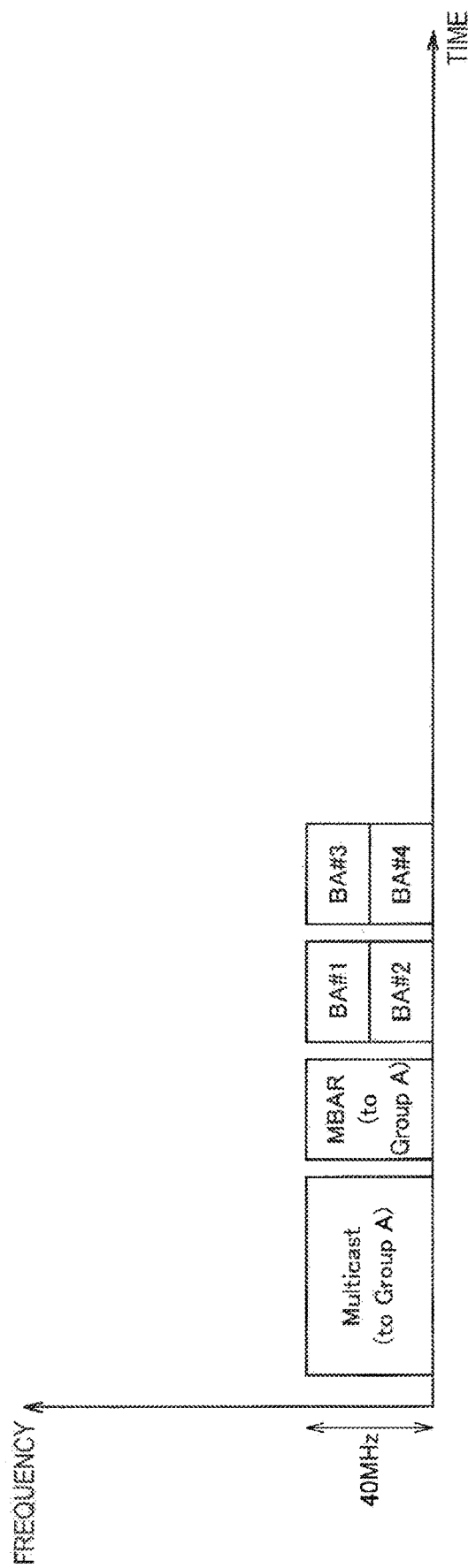
FIG. 10 is a diagram for describing an example of allocation of wireless communication resources of an AP according to a first modified example of the present embodiment.

As the first modified example of the present embodiment, the transmission acknowledgment response frame may undergo time division. Specifically, the transmission acknowledgment request frame further includes transmission time information specifying a transmission time (transmission timing) of the transmission acknowledgment response frame. For example, a transmission time field in which the transmission time information is stored is included in the Channel Info field of the MBAR frame as illustrated in FIG. 7. For example, the transmission time information may be information indicating a standby time inter frame space (IFS) from reception of the multicast frame or the MBAR frame but may be information indicating the transmission time. A process according to the present modified example will be described in detail with reference to FIG. 10. FIG. 10 is a diagram for describing an example of allocation of wireless communication resources of the AP 10 in accordance with the first modified example of the present embodiment.

The AP 10 decides the presence or absence of time division of the transmission acknowledgment response frame in accordance with the degree of congestion of the communication of the transmission acknowledgment response frame. Specifically, the AP 10 decides the presence or absence of the time division on the basis of the available bandwidth and the number of STAs 20 of the transmission acknowledgment target. For example, in a case in which the number of STAs 20 that can be allocated to the available bandwidth is equal to or larger than the number of STAs 20 of the transmission acknowledgment target, the control unit 13 decides that the time division multiplexing is performed on the transmission acknowledgment response frame. The presence or absence of the time division multiplexing may be decided on the basis of a comparison between the number of STAs 20 of the transmission acknowledgment target and a predetermined threshold value. Further, in the transmission acknowledgment response frame, a communication order may be decided chronologically instead of multiplexing.

Then, in a case in which the time division multiplexing is performed on the transmission acknowledgment response frame, the AP 10 decides the transmission time information so that the time division multiplexing is performed on the transmission acknowledgment response frame. For example, as illustrated in FIG. 10, the control unit 13 allocates a transmission period subsequent to the transmission of the MBAR frame for the BA#1 and BA#2 frames, and allocates a next transmission period subsequent to the transmission period of the BA#1 and BA#2 frames for the BA#3 and BA#4 frames. Then, the control unit 13 decides the transmission time so that each transmission acknowledgment response frame is transmitted in the transmission period.

Then, the AP 10 transmits the transmission acknowledgment request frame including the frequency allocation information and the transmission period information. For example, the data processing unit 11 generates an MBAR frame in which the decided each transmission time is stored in the BAR information for each STA 20 of the transmission acknowledgment target, that is, the transmission time field of the Channel Info field. Then, the generated MBAR frame is transmitted by the wireless communication unit 12. Further, in a case in which the time division multiplexing is not performed, a transmission acknowledgment request frame in which the transmission time information is not stored in the transmission period field may be transmitted, or a transmission acknowledgment request frame with no transmission period field may be transmitted.

The STA 20 that has received the transmission acknowledgment request frame transmits the transmission acknowledgment response frame in the transmission period allocated to the STA 20. For example, if the MBAR is received, the STAs 20#1 and 20#2 transmit the BA#1 and BA#2 frames at a timing which is temporally adjacent to the transmission of the MBAR frame as illustrated in FIG. 10. Further, after the MBAR is received, the STAs 20#3 and 20#4 transmit the BA#3 and BA#4 frames at a timing which is temporally adjacent to the transmission of the BA#1 and BA#2 frames as illustrated in FIG. 10. As a result, the time division multiplexing is performed on the BA#1 and BA#2 frames and the BA#3 and BA#4 frames.

As described above, according to the first modified example of the present embodiment, the transmission acknowledgment request frame further includes the transmission time information specifying the transmission time of the transmission acknowledgment response frame, and the transmission acknowledgment response frame is transmitted at the transmission time specified from the transmission time information and undergoes the time division. Therefore, it is possible to set more STAs 20 as the transmission acknowledgment target, and it is possible to improve the reliability of communication such as the multicast communication.

Further, the time division is performed on the transmission acknowledgment request frame on the basis of the congestion degree of the communication of the transmission acknowledgment response frame. Here, if the number of STAs 20 serving as a target of communication such as the multicast communication is increased, the frequency resources for the transmission acknowledgment response are insufficient, and thus the number of STAs 20 in which the transmission acknowledgment is not performed may increase. However, according to the present configuration, using the time division multiplexing in addition to the frequency division multiplexing, the wireless communication resources for the transmission acknowledgment response are additionally secured, and the reliability of the multicast communication can be prevented from being lowered due to the increase in the number of STAs 20.

Second Modified Example

Figure 11:
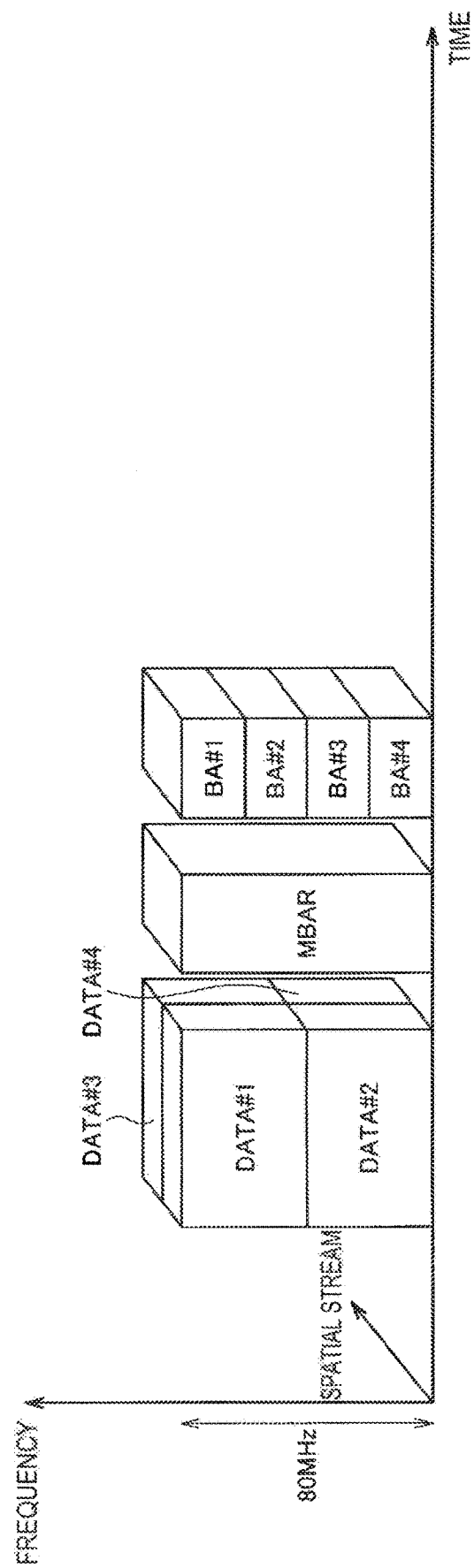
FIG. 11 is a diagram for describing an example of allocation of wireless communication resources of an AP according to a second modified example of the present embodiment.

As the second modified example of the present embodiment, the transmission acknowledgment response frame may be a transmission acknowledgment response frame for a multiplexed frame. Specifically, the transmission acknowledgment response frame undergoes the frequency division multiplexing or includes a transmission acknowledgment response frame for a frame which undergoes the space division multiplexing. A process of the present modified example will be described in detail with reference to FIG. 11. FIG. 11 is a diagram for describing an example of allocation of wireless communication resources of the AP 10 according to the second modified example of the present embodiment.

Instead of transmission of data frames using a multicast method, the AP 10 transmits a frame group which has undergone the space division multiplexing and the frequency division multiplexing to the STA 20. For example, the AP 10 transmits data frames DATA#1 to DATA#4 which have undergone the space division multiplexing and the frequency division multiplexing illustrated in FIG. 11 to each of the STAs 20#1 to 20#4. Further, only the frequency division multiplexing or the space division multiplexing may be performed on the data frames DATA#1 to DATA#4.

Then, the AP 10 transmits the transmission acknowledgment request frame for the multiplexed frame group to each of the STAs 20 of the transmission acknowledgment target. For example, the AP 10 transmits the MBAR including the BAR information for each of the data frames DATA#1 to DATA#4. Instead of the MBAR frame, the BAR frame group obtained by performing the frequency division multiplexing or the space division multiplexing on the BAR#1 to BAR#4 frames for each of the data frames DATA#1 to DATA#4 may be transmitted. Further, in this case, each of the data frames and each of the corresponding BAR frames may be connected (aggregated).

Then, the STA 20 which has received the transmission acknowledgment request frame transmits the transmission acknowledgment response frame on the basis of the frequency allocation information included in the transmission acknowledgment request frame. For example, the STAs 20#1 to 20#4 transmits the BA#1 to BA#4 frames, and the BA#1 to BA#4 frames are subjected to the frequency division multiplexing. Further, in a case in which the STA 20 supports the space division multiplex communication, the BA frame group may undergo the space division multiplexing.

As described above, according to the second modified example of the present embodiment, the transmission acknowledgment response frame includes the transmission acknowledgment response frame for the frame which has undergone the frequency division multiplexing or the space division multiplexing. Therefore, it is possible to effectively use the wireless communication resources while improving the reliability of communication even for the multiplex communication.

3. Application Example

The technology according to the present disclosure can be applied to various products. For example, the communication device 20 (that is, the STA 20) may be realized as mobile terminals such as smartphones, tablet personal computers (PCs), notebook PCs, portable game terminals, or digital cameras, fixed-type terminals such as television receivers, printers, digital scanners, or network storages, or car-mounted terminals such as car navigation devices. In addition, the STA 20 may be realized as terminals that perform machine to machine (M2M) communication (also referred to as machine type communication (MTC) terminals) such as smart meters, vending machines, remotely controlled monitoring devices, or point of sale (POS) terminals. Furthermore, the STA 20 may be wireless communication modules mounted in such terminals (for example, integrated circuit modules configured by one die).

On the other hand, for example, the communication device 10 (that is, the AP 10) may be realized as a wireless LAN access point (also referred to as a wireless base station) which has a router function or does not have a router function. The AP 10 may be realized as a mobile wireless LAN router. The AP 10 may also be a wireless communication module (for example, an integrated circuit module configured with one die) mounted on such a device.

3-1. First Application Example

Figure 12:
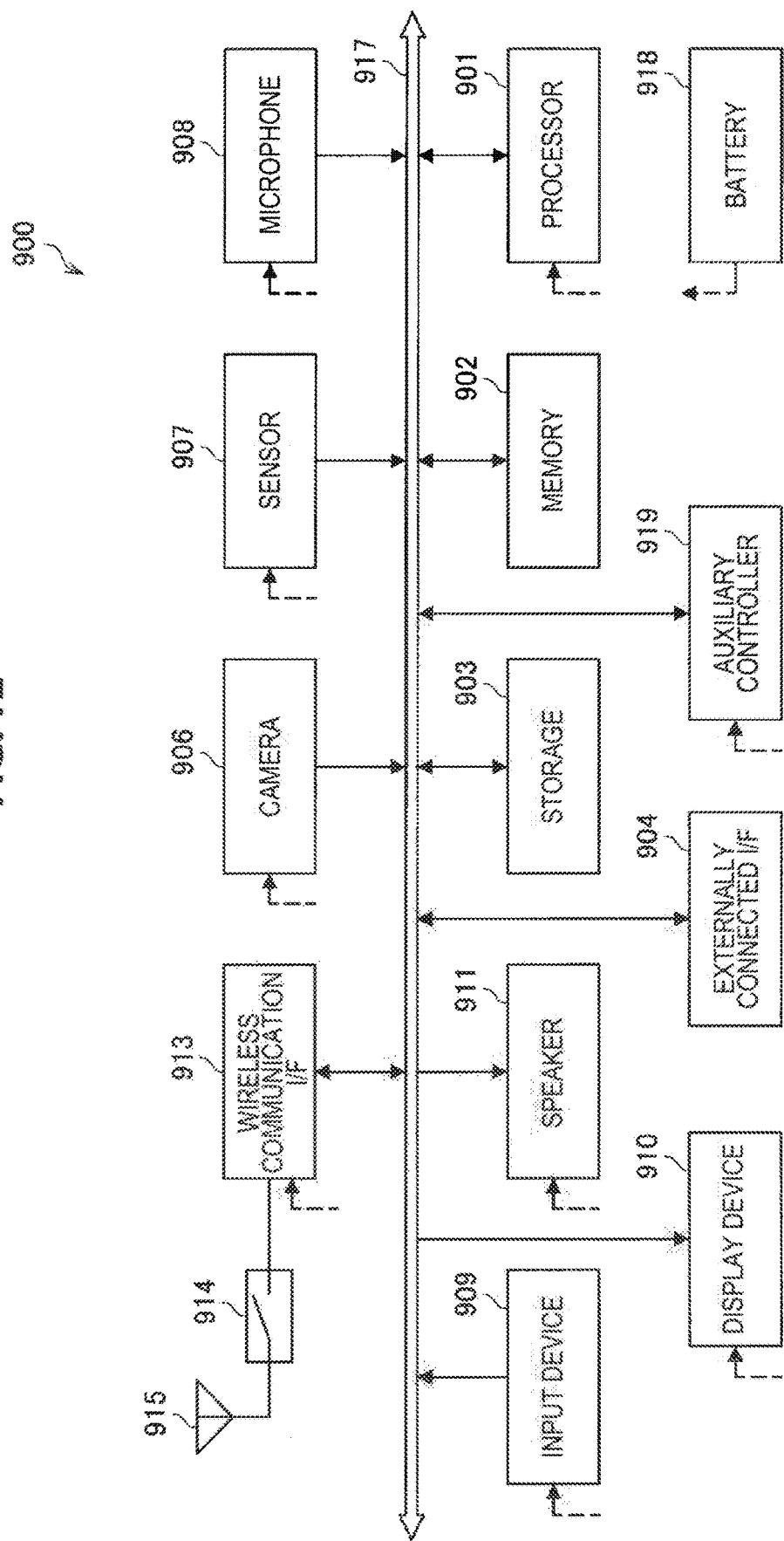
FIG. 12 is a block diagram illustrating an example of a schematic configuration of a smartphone.

FIG. 12 is a block diagram illustrating an example of a schematic configuration of a smartphone 900 to which the technology of the present disclosure can be applied. The smartphone 900 includes a processor 901, a memory 902, a storage 903, an externally connected interface 904, a camera 906, a sensor 907, a microphone 908, a input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system on chip (SoC), and controls functions of an application layer and other layers of the smartphone 900. The memory 902 includes random access memory (RAM) and read only memory (ROM), and stores data and programs executed by the processor 901. The storage 903 can include a storage medium such as a semiconductor memory or a hard disk. The externally connected interface 904 is an interface for connecting an externally attached device such as a memory card or a universal serial bus (USB) device to the smartphone 900.

The camera 906 has an image sensor, for example, a charge coupled device (CCD) or a complementary metal oxide semiconductor (CMOS), to generate captured images. The sensor 907 can include a sensor group including, for example, a positioning sensor, a gyro sensor, a geomagnetic sensor, an acceleration sensor, and the like. The microphone 908 converts sounds input to the smartphone 900 into audio signals. The input device 909 includes, for example, a touch sensor that detects touches on a screen of the display device 910, a key pad, a keyboard, buttons, switches, and the like, to receive operation or information input from a user. The display device 910 has a screen such as a liquid crystal display (LCD), or an organic light emitting diode (OLED) display to display output images of the smartphone 900. The speaker 911 converts audio signals output from the smartphone 900 into sounds.

The wireless communication interface 913 supports one or more wireless LAN standards of IEEE 802.11a, 11b, 11g, 11n, 11ac, and 11ad, to establish wireless communication. The wireless communication interface 913 can communicate with another device via a wireless LAN access point in an infrastructure mode. In addition, the wireless communication interface 913 can directly communicate with another device in a direct communication mode such as an ad hoc mode or Wi-Fi Direct (registered trademark). Note that, Wi-Fi Direct is different from the ad hoc mode. One of two terminals operates as an access point, and communication is performed directly between the terminals. The wireless communication interface 913 can typically include a baseband processor, a radio frequency (RF) circuit, a power amplifier, and the like. The wireless communication interface 913 may be a one-chip module on which a memory that stores a communication control program, a processor that executes the program, and a relevant circuit are integrated. The wireless communication interface 913 may support another kind of wireless communication scheme such as a cellular communication scheme, a near-field communication scheme, or a proximity wireless communication scheme in addition to the wireless LAN scheme. The antenna switch 914 switches a connection destination of the antenna 915 among a plurality of circuits (for example, circuits for different wireless communication schemes) included in the wireless communication interface 913. The antenna 915 has a single or a plurality of antenna elements (for example, a plurality of antenna elements constituting a MIMO antenna), and is used for transmission and reception of wireless signals from the wireless communication interface 913.

Note that the smartphone 900 may include a plurality of antennas (for example, antennas for a wireless LAN or antennas for a proximity wireless communication scheme, or the like), without being limited to the example of FIG. 12. In this case, the antenna switch 914 may be omitted from the configuration of the smartphone 900.

The bus 917 connects the processor 901, the memory 902, the storage 903, the externally connected interface 904, the camera 906, the sensor 907, the microphone 908, the input device 909, the display device 910, the speaker 911, the wireless communication interface 913, and the auxiliary controller 919 with each other. The battery 918 supplies electric power to each of the blocks of the smartphone 900 illustrated in FIG. 13 via power supply lines partially indicated by dashed lines in the drawing. The auxiliary controller 919 causes, for example, necessary minimum functions of the smartphone 900 to be operated in a sleep mode.

The data processing unit 11, the wireless communication unit 12, the control unit 13, and the storage unit 14 described with reference to FIG. 4 may be implemented by the wireless communication interface 913 in the smartphone 900 illustrated in FIG. 12. In addition, at least a part of these functions may be implemented by the processor 901 or the auxiliary controller 919. Further, at least some of the functions may be implemented in the processor 901 or the auxiliary controller 919. For example, when the control unit 13 causes the wireless communication unit 12 to set the transmission frequency on the basis of the frequency allocation information included in the received MBAR frame, it is possible to perform transmission and reception of the transmission acknowledgment response frame using the frequency division multiple access in the communication such as the multicast communication. Accordingly, it is possible to achieve both the improvement in the reliability of communication such as the multicast communication and the effective use of the wireless communication resources.

Note that the smartphone 900 may operate as a wireless access point (software AP) as the processor 901 executes the function of an access point at an application level. In addition, the wireless communication interface 913 may have the function of a wireless access point.

3-2. Second Application Example

Figure 13:
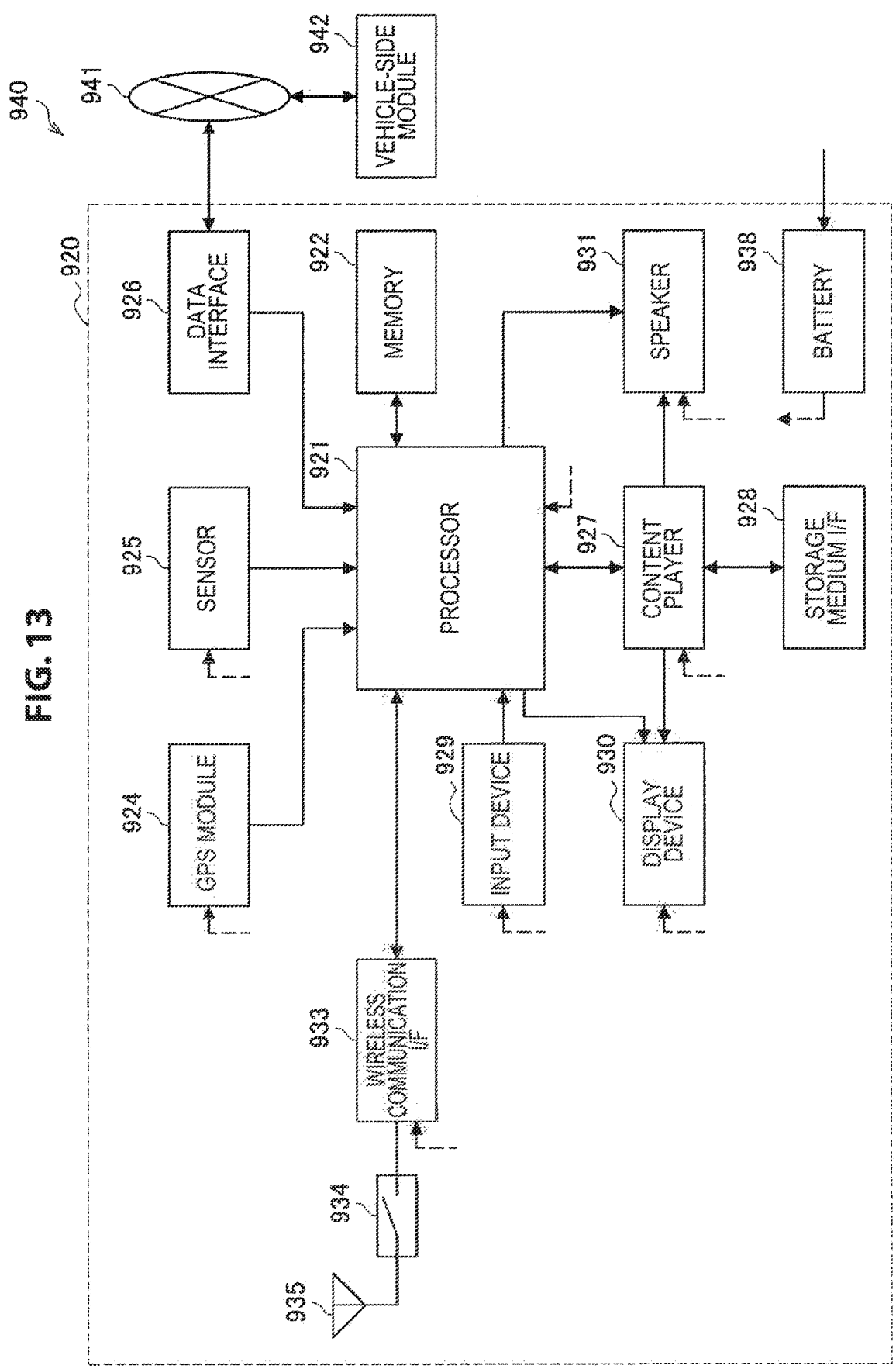
FIG. 13 is a block diagram illustrating an example of a schematic configuration of a car navigation device.

FIG. 13 is a block diagram illustrating an example of a schematic configuration of a car navigation device 920 to which the technology of the present disclosure can be applied. The car navigation device 920 includes a processor 921, a memory 922, a Global Positioning System (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC controlling a navigation function and other functions of the car navigation device 920. The memory 922 includes RAM and ROM storing data and programs executed by the processor 921.

The GPS module 924 measures a position of the car navigation device 920 (for example, latitude, longitude, and altitude) using GPS signals received from a GPS satellite. The sensor 925 can include a sensor group including, for example, a gyro sensor, a geomagnetic sensor, a barometric sensor, and the like. The data interface 926 is connected with an in-vehicle network 941 via, for example, a terminal (not illustrated) to acquire data generated on the vehicle side such as car speed data.

The content player 927 reproduces content stored in a storage medium (for example, a CD or a DVD) inserted into the storage medium interface 928. The input device 929 includes, for example, a touch sensor that detects touches on a screen of the display device 930, buttons, switches, and the like to receive operation or information input from a user. The display device 930 has a screen such as an LCD or an OLED display to display images of the navigation function or reproduced content. The speaker 931 outputs sounds of the navigation function or reproduced content.

The wireless communication interface 933 supports one or more wireless LAN standards of IEEE 802.11a, 11b, 11g, 11n, 11ac, and 11ad, to execute wireless communication. The wireless communication interface 933 can communicate with another device via a wireless LAN access point in the infrastructure mode. In addition, the wireless communication interface 933 can directly communicate with another device in a direct communication mode such as an ad hoc mode or Wi-Fi Direct. The wireless communication interface 933 can typically have a baseband processor, an RF circuit, a power amplifier, and the like. The wireless communication interface 933 may be a one-chip module on which a memory that stores a communication control program, a processor that executes the program, and a relevant circuit are integrated. The wireless communication interface 933 may support another kind of wireless communication scheme such as a near-field communication scheme, a proximity wireless communication scheme, or the cellular communication scheme in addition to the wireless LAN scheme. The antenna switch 934 switches a connection destination of the antenna 935 among a plurality of circuits included in the wireless communication interface 933. The antenna 935 has a single or a plurality of antenna elements and is used for transmission and reception of wireless signals from and to the wireless communication interface 933.

Note that the car navigation device 920 may include a plurality of antennas, without being limited to the example of FIG. 13. In this case, the antenna switch 934 may be omitted from the configuration of the car navigation device 920.

Figure 14:
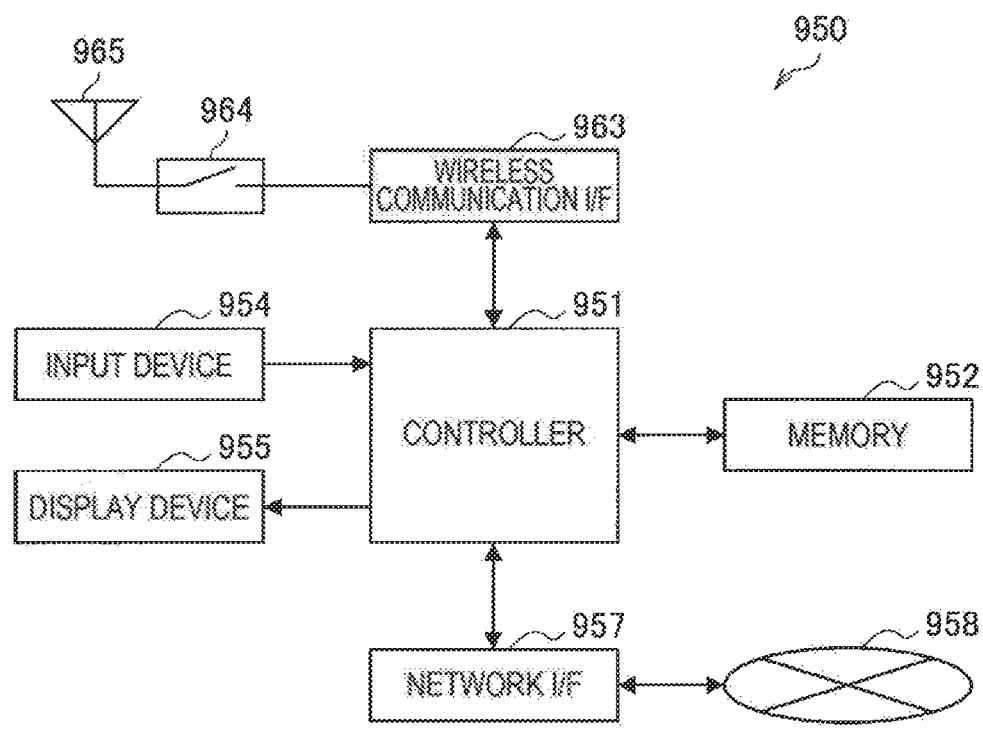
FIG. 14 is a block diagram illustrating an example of a schematic configuration of a wireless access point.

The battery 938 supplies electric power to each of the blocks of the car navigation device 920 illustrated in FIG. 14 via power supply lines partially indicated by dashed lines in the drawing. In addition, the battery 938 accumulates electric power supplied from the vehicle side.

The data processing unit 11, the wireless communication unit 12, the control unit 13, and the storage unit 14 described with reference to FIG. 4 may be implemented by the wireless communication interface 933 in the car navigation device 920 illustrated in FIG. 13. In addition, at least a part of these functions may be implemented by the processor 921. Further, at least some of the functions may be implemented in the processor 901 or the auxiliary controller 919. For example, when the control unit 13 causes the wireless communication unit 12 to set the transmission frequency on the basis of the frequency allocation information included in the received MBAR frame, it is possible to perform transmission and reception of the transmission acknowledgment response frame using the frequency division multiple access in the communication such as the multicast communication. Accordingly, it is possible to achieve both the improvement in the reliability of communication such as the multicast communication and the effective use of the wireless communication resources.

Further, the wireless communication interface 933 may operate as the AP 10 and may provide a wireless connection to a terminal owned by a user riding the vehicle. At this time, for example, when the control unit 13 transmits the MBAR frame through the data processing unit 11 and the wireless communication unit 12, it is possible to perform transmission and reception of the transmission acknowledgment response frame using the frequency division multiple access in the communication such as the multicast communication. Accordingly, it is possible to achieve both the improvement in the reliability of communication such as the multicast communication and the effective use of the wireless communication resources.

Further, the technology of the present disclosure may be realized as an in-vehicle system (or a vehicle) 940 including one or more blocks of the above-described car navigation device 920, an in-vehicle network 941, and a vehicle-side module 942. The vehicle-side module 942 generates vehicle-side data such as a vehicle speed, the number of engine rotations, or failure information and outputs the generated data to the in-vehicle network 941.

3-3. Third Application Example

FIG. 14 is a block diagram illustrating an example of a schematic configuration of a wireless access point 950 to which the technology of the present disclosure can be applied. The wireless access point 950 includes a controller 951, a memory 952, an input device 954, a display device 955, a network interface 957, a wireless communication interface 963, an antenna switch 964, and an antenna 965.

The controller 951 may be, for example, a CPU or a digital signal processor (DSP) and operates various functions (for example, access limitation, routing, encryption, a fire wall, and log management) of the Internet Protocol (IP) layer and higher layers of the wireless access point 950. The memory 952 includes RAM and ROM and stores a program executed by the controller 951 and various kinds of control data (for example, a terminal list, a routing table, an encryption key, security settings, and a log).

The input device 954 includes, for example, a button or a switch, and receives operation performed by a user. The display device 955 includes an LED lamp and displays an operation status of the wireless access point 950.

The network interface 957 is a wired communication interface that connects the wireless access point 950 with a wired communication network 958. The network interface 957 may include a plurality of connection terminals. The wired communication network 958 may be a LAN such as Ethernet (registered trademark) or may be a wide area network (WAN).

The wireless communication interface 963 supports one or more wireless LAN standards of IEEE 802.11a, 11b, 11g, 11n, 11ac, and 11ad, to supply wireless connection to a nearby terminal as an access point. The wireless communication interface 963 can typically include a baseband processor, an RF circuit, and a power amplifier. The wireless communication interface 963 may be a one-chip module in which memory storing a communication control program, a processor executing the program, and relevant circuits are integrated. The antenna switch 964 switches a connection destination of the antenna 965 among a plurality of circuits included in the wireless communication interface 963. The antenna 965 includes one antenna element or a plurality of antenna elements and is used to transmit and receive a wireless signal through the wireless communication interface 963.

The data processing unit 11, the wireless communication unit 12, the control unit 13, and the storage unit 14 described with reference to FIG. 4 may be implemented by the wireless communication interface 963 in the wireless access point 950 illustrated in FIG. 14. In addition, at least a part of these functions may be implemented by the controller 951. For example, when the MBAR frame for the multicast frame or the like is transmitted through the data processing unit 11 and the wireless communication unit 12, it is possible to perform transmission and reception of the transmission acknowledgment response frame using the frequency division multiple access in the communication such as the multicast communication. Accordingly, it is possible to achieve both the improvement in the reliability of communication such as the multicast communication and the effective use of the wireless communication resources.

4. Conclusion

As described above, according to one embodiment of the present disclosure, the transmission acknowledgment response related to the communication in which a frame is transmitted to a plurality of destinations is performed using the frequency division multiplex communication, and thus it is possible to effectively use the wireless communication resources as compared with the case in which the communication for the transmission acknowledgment response is chronologically performed while improving the reliability of the communication.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the above embodiment, both the primary channel information and the bandwidth information are included in the transmission acknowledgment request frame, that is, the BAR information, but the present technology is not limited to this example. For example, only the primary channel information may be included in the transmission acknowledgment request frame. For example, in a case in which the bandwidth allocated to the STA 20 is known to the STA 20, only the center frequency field is set in the Channel Info of the MBAR frame, and only the primary channel information is stored. In this case, the data amount of the transmission acknowledgment request frame is reduced to be smaller than the case in which the bandwidth information is included in the transmission acknowledgment request frame, and thus it is possible to reduce the communication amount and effectively use the wireless communication resources.

Similarly, in a case in which the center frequency allocated to the STA 20 is known to the STA 20, only the bandwidth information may be included in the BAR information. Further, in a case in which the transmission time of each STA 20 is known to the STA 20, the transmission acknowledgment request frame not including transmission time information may be transmitted. Further, of course, in a case in which both the center frequency and the bandwidth are known to the STA 20, only the transmission time may be included in the BAR information.

Further, in the above embodiment, the example in which the primary channel information is the information indicating the center frequency or the information for the calculation formula has been described, but the primary channel information may be the information indicating the channel number. In this case, the STA 20 specifies the center frequency from the channel number indicated by the primary channel information.

Further, in the above embodiment, the example in which the BAR information field of the transmission acknowledgment request frame is included in the portion corresponding to the payload has been described, but the BAR information field may be included in the PHY header or the MAC header.

Further, in the above embodiment, the example in which the transmission acknowledgment request frame is transmitted using the multicast scheme or the frame multiplexing scheme has been described, but the transmission acknowledgment request frame may be transmitted as a frame in which the BAR frames addressed to the STAs 20 of the transmission acknowledgment target are aggregated.

Further, in the above embodiment, the example in which the transmission acknowledgment response frame or the transmission acknowledgment request frame undergoes the frequency division multiplexing or the space division multiplexing has been described, but other frames may undergo the frequency division multiplexing or the space division multiplexing. For example, the BAR frame group and the data frame illustrated in FIG. 11 may undergo the frequency division multiplexing or the space division multiplexing using a frequency or a spatial stream which is empty.

Further, in the above embodiment, for the sake of description, the example in which there is an empty band in FIG. 6 has been described, but it is desirable to allocate the wireless communication resources so that there is no empty band as illustrated in FIG. 5 in order to effectively use the wireless communication resources.

In the above embodiment, the example in which the bandwidth used for the communication in FIGS. 5, 6, 10, and 11 is 80 MHz or 40 MHz has been described, but the bandwidth may be larger or smaller.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A communication device, including:
 a communication unit configured to perform communication of a frame,
 in which the communication unit
  transmits a transmission acknowledgment request frame for a transmission acknowledgment response frame including frequency allocation information specifying a transmission frequency of the transmission acknowledgment response frame, and
  receives the transmission acknowledgment response frame which has undergone frequency division multiplexing, on the basis of the frequency allocation information.

(2)
The communication device according to (1),
in which the transmission acknowledgment response frame is transmitted through the transmission frequency specified from the frequency allocation information.

(3)
The communication device according to (1) or (2),
in which the transmission acknowledgment response frame includes a transmission acknowledgment response frame for a multicast frame.

(4)
The communication device according to any one of (1) to (3),
in which the transmission acknowledgment response frame includes a transmission acknowledgment response frame for a frame which has undergone frequency division multiplexing or space division multiplexing.

(5)
The communication device according to any one of (1) to (4),
in which the transmission acknowledgment request frame is connected to a frame which is a transmission acknowledgment target.

(6)
The communication device according to any one of (1) to (5),
in which the transmission acknowledgment request frame further includes transmission time information specifying a transmission time of the transmission acknowledgment response frame, and
the communication unit receives the transmission acknowledgment response frame which has undergone time division, on the basis of the transmission time information.

(7)
The communication device according to any one of (1) to (6),
in which the transmission acknowledgment request frame includes response device information specifying the communication device which is requested to transmit the transmission acknowledgment response frame, and
the communication unit receives the transmission acknowledgment response frame from the communication device specified on the basis of the response device information.

(8)
The communication device according to any one of (1) to (7),
in which the frequency allocation information includes information specifying a center frequency of the transmission frequency.

(9)
The communication device according to (8),
in which the center frequency differs in accordance with respective destinations of the transmission acknowledgment request frame transmitted in a same period.

(10)
The communication device according to (8) or (9),
in which the center frequency is specified on the basis of at least one of identification information for a destination of the transmission acknowledgment request frame and time information of the own device.

(11)
The communication device according to any one of (8) to (10),
in which the center frequency differs from a center frequency of a frame which is a transmission acknowledgment target.

(12)
The communication device according to any one of (8) to (11),
in which the frequency allocation information includes information specifying a bandwidth of the transmission frequency.

(13)
The communication device according to (12),
in which the bandwidths are different between at least some of destinations of the transmission acknowledgment request frame.

(14)
The communication device according to (12) or (13),
in which the bandwidth used for transmission of the transmission acknowledgment request frame in a same period is different from a bandwidth of a frame which is a transmission acknowledgment target.

(15)
A communication device, including:
a communication unit configured to perform communication of a frame,
in which the communication unit
receives a transmission acknowledgment request frame for a transmission acknowledgment response frame including frequency allocation information specifying a transmission frequency of the transmission acknowledgment response frame, and
transmits the transmission acknowledgment response frame on the basis of the frequency allocation information, and
the transmission acknowledgment response frame undergoes frequency division multiplexing.

(16)
The communication device according to (15),
in which the communication unit transmits the transmission acknowledgment response frame through the transmission frequency specified from the frequency allocation information.

(17)
The communication device according to (15) or (16),
in which the transmission acknowledgment request frame further includes transmission time information specifying a transmission time of the transmission acknowledgment response frame,
the communication unit transmits the transmission acknowledgment response frame at the transmission time specified from the transmission time information, and
the transmission acknowledgment response frame undergoes time division.

(18)
The communication device according to any one of (15) to (17),
in which the transmission acknowledgment request frame includes response device information specifying the communication device which is requested to transmit the transmission acknowledgment response frame, and
the communication unit transmits the transmission acknowledgment response frame in a case in which the own device is the communication device specified from the response device information.

(19)

A communication method, including:
transmitting, by a communication unit configured to perform communication of a frame, a transmission acknowledgment request frame for a transmission acknowledgment response frame including frequency allocation information specifying a transmission frequency of the transmission acknowledgment response frame; and
receiving the transmission acknowledgment response frame which has undergone frequency division multiplexing, on the basis of the frequency allocation information.

(20)

A communication method, including:
receiving, by a communication unit configured to perform communication of a frame, a transmission acknowledgment request frame for a transmission acknowledgment response frame including frequency allocation information specifying a transmission frequency of the transmission acknowledgment response frame; and
transmitting the transmission acknowledgment response frame on the basis of the frequency allocation information,
in which the transmission acknowledgment response frame undergoes frequency division multiplexing.

REFERENCE SIGNS LIST 10 communication device, AP
11 data processing unit
12 wireless communication unit
13 control unit
14 storage unit
20 communication device, STA

The invention claimed is:

1. A communication control device, comprising:
one or more circuits configured to control communication of a data frame,
wherein the one or more circuits are configured to control to
transmit, by multicast after the communication of the data frame, a block acknowledgment request (BAR) frame for a block acknowledgment (BA) frame including frequency allocation information specifying a transmission frequency of the BA frame, the BA frame acknowledging the data frame communicated from the communication control device, and
receive the BA frame which is frequency division multiplexed, on the basis of the frequency allocation information,
wherein the BAR frame includes a receiver address field storing an identifier of a multicast group specifying destinations of the BAR frame and identification information fields specifying each of one or more destinations of the BAR frame, identification information being association identifiers of the one or more destinations selected from the multicast group, the frequency allocation information being specified for each of the association identifiers.

2. The communication control device according to claim 1, wherein
the frequency allocation information includes a first piece of information for each of the one or more destinations selected from the multicast group individually and a second piece of information common to all of the one or more destinations selected from the multicast group, the first piece of information for a first destination, which is included in the destinations of the multicast group, is sent after information of an identifier of the first destination, and
the second piece of information includes information specifying a bandwidth of the transmission frequency.

3. The communication control device according to claim 1, wherein sum of the bandwidth of the transmission frequencies in the BAR frame is different from bandwidth allocated to the data frame.

4. The communication control device according to claim 3, wherein sum of the the bandwidth of the transmission frequency in the BAR frame is narrower than bandwidth allocated to the data frame.

5. The communication control device according to claim 3, wherein sum of the bandwidth of the transmission frequency in the BAR frame is wider than bandwidth allocated to the data frame.

6. The communication control device according to claim 1, wherein bandwidth used for transmitting the BA frame is the same as bandwidth used for transmitting the data frame.

7. The communication control device according to the claim 6,
wherein bandwidth used for transmitting the BA frame is the same as bandwidth used for transmitting the BAR frame.

8. The communication control device according to claim 1,
wherein the BAR frame includes transmission time information specifying a transmission time of the BA frame.

9. The communication control device according to claim 1, further comprising:
a processor being electrically connected to the communication control device,
a memory,
an input, and
a display device.

10. The communication control device according to claim 1,
wherein the BA frame is transmitted through the transmission frequency specified from the frequency allocation information.

11. The communication control device according to claim 1,
wherein the BA frame is requested to acknowledge the data frame which is frequency division multiplexed or space division multiplexed.

12. The communication control device according to claim 1,
wherein the BAR frame is aggregated with the data frame communicated from the communication control device.

13. The communication control device according to claim 1, wherein
the BAR frame further includes transmission time information specifying a transmission time of the BA frame, and
the one or more circuits are configured to receive the BA frame, which is lime division multiplexed, on the basis of the transmission time information.

14. The communication control device according to claim 1, wherein
the one or more circuits are configured to receive the BA frame from the destination specified on the basis of identification information and the frequency allocation information.

15. The communication control device according to claim 1, wherein a center frequency for the transmission frequency differs in accordance with respective destinations of the BAR frame transmitted in a same period, and/or on the basis of at least one of the identification information for a destination of the BAR frame and time information of the communication control device, and/or differs from a center frequency of the data frame.

16. The communication control device according to claim 1,
wherein the frequency allocation information specifies a center frequency of the transmission frequency.

17. The communication control device according to claim 1,
wherein bandwidths are different between at least some of the one or more destinations of the BAR frame.

18. The communication control device according to claim 1, wherein a bandwidth used for transmission of the BAR frame in a same period is different from a bandwidth of the data frame.

19. A communication control device, comprising:
one or more circuits configured to control communication of a data frame,
wherein the one or more circuits are configured to control to
receive a block acknowledgment request (BAR) frame for a block acknowledgment (BA) frame including frequency allocation information specifying a transmission frequency of the BA frame, the BA frame acknowledging the data frame communicated from the communication control device, and
transmit the BA frame which is frequency division multiplexed, on the basis of the frequency allocation information,
wherein the BAR frame includes a receiver address field storing an identifier of a multicast group specifying destinations of the BAR frame and identification information fields specifying each of one or more destinations of the BAR frame, identification information being association identifiers of the one or more destinations selected from the multicast group, the frequency allocation information being specified for each of the association identifiers.

20. The communication control device according to claim 19,
wherein the one or more circuits are configured to transmit the BA frame through the transmission frequency specified by the frequency allocation information.

21. The communication control device according to claim 19,
wherein the BAR frame further includes transmission time information specifying a transmission time of the BA frame, the one or more circuits are further configured to transmit the BA frame at the transmission time specified by the transmission time information, and the BA frame is time division multiplexed.

22. The communication control device according to claim 19,
wherein the one or more circuits are further configured to transmit the BA frame in a case in which the communication control device is specified by the identification information.

23. The communication control device according to claim 19, wherein
the frequency allocation information includes a first piece of information for each of the one or more destinations selected from the multicast group individually and a second piece of information common to all of the one or more destinations selected from the multicast group,
the first piece of information for a first destination, which is included in the destinations of the multicast group, is sent after information of an identifier of the first destination, and
the second piece of information includes information specifying a bandwidth of the transmission frequency.

24. The communication control device according to claim 19,
wherein sum of the bandwidth of the transmission frequencies in the BAR frame is different from bandwidth allocated to the data frame.

25. The communication control device according to claim 24,
wherein sum of the bandwidth of the transmission frequency in the BAR frame is narrower than bandwidth allocated to the data frame.

26. The communication control device according to claim 25,
wherein sum of the bandwidth of the transmission frequency in the BAR frame is wider than bandwidth allocated to the data frame.

27. The communication control device according to claim 19,
wherein bandwidth used for transmitting the BA frame is the same as bandwidth used for transmitting the data frame.

28. The communication control device according to claim 27,
wherein bandwidth used for transmitting the BA frame is the same as bandwidth used for transmitting the BAR frame.

29. The communication control device according to claim 19,
wherein the BAR frame includes transmission time information specifying a transmission time of the BA frame.

30. The communication control device according to claim 19, further comprising:
a processor being electrically connected to the communication control device,
a memory,
an input, and
a display device.

31. The communication control device according to claim 19,
wherein the BA frame is transmitted through the transmission frequency specified from the frequency allocation information.

32. The communication control device according to claim 19,
wherein the BA frame is requested to acknowledge the data frame which is frequency division multiplexed or space division multiplexed.

33. The communication control device according to claim 19,
wherein the BAR frame is aggregated with the data frame communicated from the communication control device.

34. The communication control device according to claim 19, wherein
the BAR frame further includes transmission time information specifying a transmission time of the BA frame, and
the one or more circuits are configured to receive the BA frame, which is lime division multiplexed, on the basis of the transmission time information.

35. The communication control device according to claim 19, wherein
the one or more circuits are configured to receive the BA frame from the destination specified on the basis of identification information and the frequency allocation information.

36. The communication control device according to claim 19,
wherein a center frequency for the transmission frequency differs in accordance with respective destinations of the BAR frame transmitted in a same period, and/or on the basis of at least one of the identification information for a destination of the BAR frame and time information of the communication device, and/or differs from a center frequency of the data frame.

37. The communication control device according to claim 19,
wherein the frequency allocation information specifies a center frequency of the transmission frequency.

38. The communication control device according to claim 19,
wherein bandwidths are different between at least some of the one or more destinations of the BAR frame.

39. The communication control device according to claim 19,
wherein a bandwidth used for transmission of the BAR frame in a same period is different from a bandwidth of the data frame.

40. A communication control method, comprising:
controlling communication of a data frame, including controlling
multicasting, by circuitry configured to perform communication of a data frame before the multicasting, after the communication of the data frame, a block acknowledgment request (BAR) frame for a block acknowledgment (BA) frame including frequency allocation information specifying a transmission frequency of the BA frame, the BA frame acknowledging the data frame communicated from the circuitry, and
receiving the BA frame which is frequency division multiplexed, on the basis of the frequency allocation information,
wherein the BAR frame includes a receiver address field storing an identifier of a multicast group specifying destinations of the BAR frame and identification information fields specifying each of one or more destinations of the BAR frame, identification information being association identifiers of the one or more destinations selected from the multicast group, the frequency allocation information being specified for each of the association identifiers.

41. A communication control method, comprising:
controlling communication of a data frame, including controlling
receiving, by circuitry configured to receive a data frame after communication of the data frame, a block acknowledgment request (BAR) frame for a block acknowledgment (BA) frame including frequency allocation information specifying a transmission frequency of the BA frame, the BA frame acknowledging the data frame communicated from the circuitry, and
transmit the BA frame which is frequency division multiplexed, on the basis of the frequency allocation information,
wherein the BAR frame includes a receiver address field storing an identifier of a multicast group specifying destinations of the BAR frame and identification information fields specifying each of one or more destinations of the BAR frame, identification information being association identifiers of the one or more destinations selected from the multicast group, the frequency allocation information being specified for each of the association identifiers.

* * * * *